United States Patent
Kim et al.

(10) Patent No.: US 8,368,312 B2
(45) Date of Patent: Feb. 5, 2013

(54) CIRCUIT AND METHOD OF DRIVING LIGHT EMITTING DIODES, AND LIGHT EMITTING DIODE SYSTEM HAVING THE SAME

(75) Inventors: Yong-Hun Kim, Seoul (KR); Wan-Jung Kim, Suwon-si (KR); Hee-Seok Han, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 223 days.

(21) Appl. No.: 12/840,539

(22) Filed: Jul. 21, 2010

(65) Prior Publication Data

US 2011/0109243 A1 May 12, 2011

(30) Foreign Application Priority Data

Nov. 9, 2009 (KR) .................. 10-2009-0107714

(51) Int. Cl.
G09G 5/10 (2006.01)
H05B 37/00 (2006.01)

(52) U.S. Cl. ............... 315/185 R; 315/294; 315/193; 315/307; 345/82; 345/690; 345/102

(58) Field of Classification Search .......... 345/82–84, 345/102, 690, 211; 315/185 R, 192, 193, 315/210, 294, 307–308, 320
See application file for complete search history.

(56) References Cited

U.S. PATENT DOCUMENTS

| 7,724,219 B2 * | 5/2010 | Ikeda ........................ 345/82 |
| 8,018,170 B2 * | 9/2011 | Chen et al. ............... 315/192 |
| 2005/0190171 A1 | 9/2005 | Jang et al. |
| 2006/0256050 A1 | 11/2006 | Ikeda |
| 2009/0261743 A1 * | 10/2009 | Chen et al. ............... 315/192 |
| 2010/0194299 A1 * | 8/2010 | Ye et al. ................... 315/192 |

FOREIGN PATENT DOCUMENTS

| JP | 2005-191006 A | 7/2005 |
| JP | 2006-319057 A | 11/2006 |
| JP | 2009-182097 A | 8/2009 |
| KR | 10-2005-0062852 A | 6/2005 |
| KR | 10-2006-0116736 A | 11/2006 |

* cited by examiner

Primary Examiner — Vibol Tan
(74) Attorney, Agent, or Firm — Lee & Morse, P.C.

(57) ABSTRACT

A light-emitting-diode driving circuit includes a current driving circuit configured to control current signals flowing through light-emitting-diode strings in response to a first signal that includes information of a light-emitting-diode current, a dynamic headroom controller configured to generate a third control signal that changes according to a change of the current signals flowing through the light-emitting-diode strings based on voltage signals of first terminals of each of the light-emitting-diode strings and a second control signal that includes the information of the light-emitting-diode current, and a power supply circuit configured to generate a light-emitting-diode driving voltage that changes in response to the third control signal, and provide the light-emitting-diode driving voltage to second terminals of each of the light-emitting-diode strings.

18 Claims, 22 Drawing Sheets

FIG. 20

| COMO1 | COMO2 | COMO3 | TCOMO | REF_DHC |
|---|---|---|---|---|
| 0 | 0 | 0 | not used | REF_DHC4 |
| 0 | 0 | 1 | not used | REF_DHC3 |
| 0 | 1 | 1 | not used | REF_DHC2 |
| 1 | 1 | 1 | not used | REF_DHC1 |
| 0 | 0 | 0 | 0 | REF_DHC4 |
| 0 | 0 | 1 | 0 | REF_DHC3-PVTEM |
| 0 | 1 | 1 | 0 | REF_DHC2-PVTEM |
| 1 | 1 | 1 | 0 | REF_DHC1-PVTEM |
| 0 | 0 | 0 | 1 | REF_DHC4+PVTEM |
| 0 | 0 | 1 | 1 | REF_DHC3+PVTEM |
| 0 | 1 | 1 | 1 | REF_DHC2+PVTEM |
| 1 | 1 | 1 | 1 | REF_DHC1 |

CIRCUIT AND METHOD OF DRIVING LIGHT EMITTING DIODES, AND LIGHT EMITTING DIODE SYSTEM HAVING THE SAME

BACKGROUND

1. Field

Example embodiments relate to a light-emitting-diode driving circuit, and particularly to a light-emitting-diode driving circuit occupying a small area in a semiconductor integrated circuit, and a light-emitting-diode system having the light-emitting-diode driving circuit.

2. Description of Related Art

Research on various types of light emitting technology is in progress due to the market for eco-friendly and low-cost products. Among display devices now in use, there are plasma-display panels (PDP), liquid-crystal displays (LCD), light-emitting-diode (LED) display devices, etc. The LED display device is a self-emitting device that emits light in response to a voltage applied between two terminals, and gets the spotlight as a next generation technology because of its merits of stability, low heating value, and low power consumption. LED display devices are used as not only for lamp devices but also for back-light units of LCD devices.

SUMMARY

It is a feature of an embodiment to provide a light-emitting-diode driving circuit capable of decreasing the size of power transistors that control currents flowing through light-emitting-diode strings.

It is another feature of an embodiment to provide a light-emitting-diode system including the light-emitting-diode driving circuit.

It is another feature of an embodiment to provide a method of driving a light-emitting-diode capable of decreasing the size of power transistors that control currents flowing through light-emitting-diode strings.

At least one of the above and other features and advantages may be realized by providing a light-emitting-diode driving circuit, including a current driving circuit configured to control current signals flowing through light-emitting-diode strings in response to a first signal that includes information of a light-emitting-diode current, a dynamic headroom controller configured to generate a third control signal that changes according to a change of the current signals flowing through the light-emitting-diode strings based on voltage signals of first terminals of each of the light-emitting-diode strings and a second control signal that includes the information of the light-emitting-diode current, and a power supply circuit configured to generate a light-emitting-diode driving voltage that changes in response to the third control signal, and provide the light-emitting-diode driving voltage to second terminals of each of the light-emitting-diode strings.

The first control signal and the second control signal may be configured to be generated based on an information signal of a target light-emitting-diode current generated inside or outside of a semiconductor integrated circuit in which the light-emitting-diode driving circuit is included.

The dynamic headroom controller may include a level detector configured to detect voltage levels of the voltage signals of the first terminals of each of the light-emitting-diode strings, and generate a minimum detection voltage signal having a minimum voltage level of the detected voltage levels, a reference voltage generating circuit configured to generate a first reference voltage that changes in response to the second control signal, and a comparator configured to compare the minimum detection voltage signal with the first reference voltage to generate the third control signal.

The reference voltage generating circuit may include a comparing circuit configured to compare the second control signal with at least one output reference voltage having different voltage levels from each other to generate at least one comparison output voltage signal, a selecting circuit configured to select one of the comparison output voltages, and a digital-to-analog converter configured to perform digital-to-analog conversion with respect to an output signal of the selecting circuit to generate the first reference voltage.

The comparing circuit may include at least one comparator that compares the second control signal with each of the output reference voltages to generate the comparison output voltages.

The reference voltage generating circuit may include a comparing circuit configured to compare the second control signal with at least one output reference voltage having different voltage levels from each other to generate at least one comparison output voltage signal, and a digital-to-analog converter configured to perform digital-to-analog conversion with respect to the comparison output voltage signals to generate the first reference voltage.

The first control signal and the second control signal may be configured to be a voltage signal that is generated by adjusting a current of a current source in response to an information signal of a light-emitting-diode current.

The first control signal may be configured to be a voltage signal that is generated by adjusting a current of a current source in response to an information signal of a light-emitting-diode current, and the second control signal may be configured to be a signal that is output from a memory device in which the information signal of the light-emitting-diode current is stored.

Drain-source voltages of power transistors constituting the current driving circuit may be configured to be changed according to changes of current signals flowing through the light-emitting-diode strings.

The current signals flowing through the light-emitting-diode strings may be configured to be the same as drain currents of the power transistors.

At least one of the above and other features and advantages may also be realized by providing a light-emitting-diode driving circuit, including a current driving circuit configured to control current signals flowing through light-emitting-diode strings in response to a first signal that includes information of a light-emitting-diode current, a dynamic headroom controller configured to generate a third control signal that changes according to a change of the current signals flowing through the light-emitting-diode strings based on voltage signals of first terminals of each of the light-emitting-diode strings, a second control signal that includes the information of the light-emitting-diode current, and a temperature sensing voltage signal that includes information of a semiconductor chip temperature, and a power supply circuit configured to generate a light-emitting-diode driving voltage that changes in response to the third control signal, and provide the light-emitting-diode driving voltage to second terminals of each of the light-emitting-diode strings.

The dynamic headroom controller may include a level detector configured to detect voltage levels of the voltage signals of the first terminals of each of the light-emitting-diode strings, and generate a minimum detection voltage signal having a minimum voltage level of the detected voltage levels, a reference voltage generating circuit configured to generate a first reference voltage that changes in response to the second control signal and the temperature sensing voltage signal, and a comparator configured to compare the minimum detection voltage signal with the first reference voltage to generate the third control signal.

The reference voltage generating circuit may include a comparing circuit configured to compare the second control signal with at least one output reference voltage having different voltage levels from each other and compare the temperature sensing voltage signal with at least one temperature reference voltage having different voltage levels from each other to generate at least one comparison output voltage signal, a selecting circuit configured to select one of the comparison output voltages, and a digital-to-analog converter configured to perform digital-to-analog conversion with respect to an output signal of the selecting circuit to generate the first reference voltage.

The comparing circuit may include at least one comparator that compares the second control signal with each of the output reference voltages and compares the temperature sensing voltage signal with each of the temperature reference voltages to generate the comparison output voltages.

The reference voltage generating circuit may include a comparing circuit configured to compare the second control signal with at least one output reference voltage having different voltage levels from each other and compare the temperature sensing voltage signal with at least one temperature reference voltage having different voltage levels from each other to generate at least one comparison output voltage signal, and a digital-to-analog converter configured to perform digital-to-analog conversion with respect to the comparison output voltage signals to generate the first reference voltage.

The light-emitting-diode driving circuit may further include a temperature sensing circuit that senses a temperature of a semiconductor integrated circuit in which the light-emitting-diode driving circuit is included, and generates the temperature sensing voltage signal.

At least one of the above and other features and advantages may also be realized by providing a light-emitting-diode system, including a light-emitting-diode array that emits a light in response to a light-emitting-diode driving voltage, and a light-emitting-diode driving circuit configured to generate the light-emitting-diode driving voltage, and change drain-source voltages of power transistors according to a magnitude of currents flowing through the power transistors that control currents flowing through light-emitting-diode strings constituting the light-emitting-diode array.

The light-emitting-diode driving circuit may include a current driving circuit configured to control current signals flowing through the light-emitting-diode strings in response to a first signal that includes information of a light-emitting-diode current, a dynamic headroom controller configured to generate a third control signal that changes according to a change of the current signals flowing through the light-emitting-diode strings based on voltage signals of first terminals of each of the light-emitting-diode strings and a second control signal that includes the information of the light-emitting-diode current, and a power supply circuit configured to generate a light-emitting-diode driving voltage that changes in response to the third control signal, and provide the light-emitting-diode driving voltage to second terminals of each of the light-emitting-diode strings.

Each of the light-emitting-diode strings may include at least one light-emitting diode.

The second terminals of each of the light-emitting-diode strings may be electrically coupled to each other.

At least one of the above and other features and advantages may also be realized by providing a method of driving a light-emitting diode, including controlling current signals flowing through light-emitting-diode strings in response to a first signal that includes information of a light-emitting-diode current, sensing voltage signals of first terminals of each of the light-emitting-diode strings, generating a third control signal that changes according to a change of the current signals flowing through the light-emitting-diode strings based on the voltage signals of the first terminals of each of the light-emitting-diode strings and a second control signal that includes the information of the light-emitting-diode current, generating a light-emitting-diode driving voltage that changes in response to the third control signal, and providing the light-emitting-diode driving voltage to second terminals of each of the light-emitting-diode strings.

The generating of the third control signal may include detecting voltage levels of the voltage signals of the first terminals of each of the light-emitting-diode strings, generating a minimum detection voltage signal having a minimum voltage level of the detected voltage levels, generating a first reference voltage that changes in response to the second control signal, and comparing the minimum detection voltage signal with the first reference voltage to generate the third control signal.

At least one of the above and other features and advantages may also be realized by providing a method of driving a light-emitting diode, including controlling current signals flowing through light-emitting-diode strings in response to a first signal that includes information of a light-emitting-diode current, sensing voltage signals of first terminals of each of the light-emitting-diode strings, generating a third control signal that changes according to a change of the current signals flowing through the light-emitting-diode strings based on the voltage signals of the first terminals of each of the light-emitting-diode strings, a second control signal that includes the information of the light-emitting-diode current, and a temperature sensing voltage signal that includes information of a semiconductor chip temperature, generating a light-emitting-diode driving voltage that changes in response to the third control signal, and providing the light-emitting-diode driving voltage to second terminals of each of the light-emitting-diode strings.

The generating of the third control signal may include detecting voltage levels of the voltage signals of the first terminals of each of the light-emitting-diode strings, generating a minimum detection voltage signal having a minimum voltage level of the detected voltage levels, generating a first reference voltage that changes in response to the second control signal and the temperature sensing voltage signal, and comparing the minimum detection voltage signal with the first reference voltage to generate the third control signal.

At least one of the above and other features and advantages may also be realized by providing a display device, including a display panel, a back-light driving circuit configured to generate a light-emitting-diode driving voltage and change drain-source voltages of power transistors according to a magnitude of currents flowing through the power transistors that control currents flowing through light-emitting-diode strings based on a target light-emitting-diode current and/or a temperature sensing voltage signal, and a back-light unit that includes the light-emitting-diode strings, operates in response to the light-emitting-diode driving voltage, and provides a light to the display panel.

BRIEF DESCRIPTION OF THE DRAWINGS

The above and other features and advantages will become more apparent to those of ordinary skill in the art by describing in detail exemplary embodiments with reference to the attached drawings, in which:

FIG. 20 illustrates a table for explaining operations of the dynamic headroom controller of FIG. 16.

DETAILED DESCRIPTION

Figure 1:
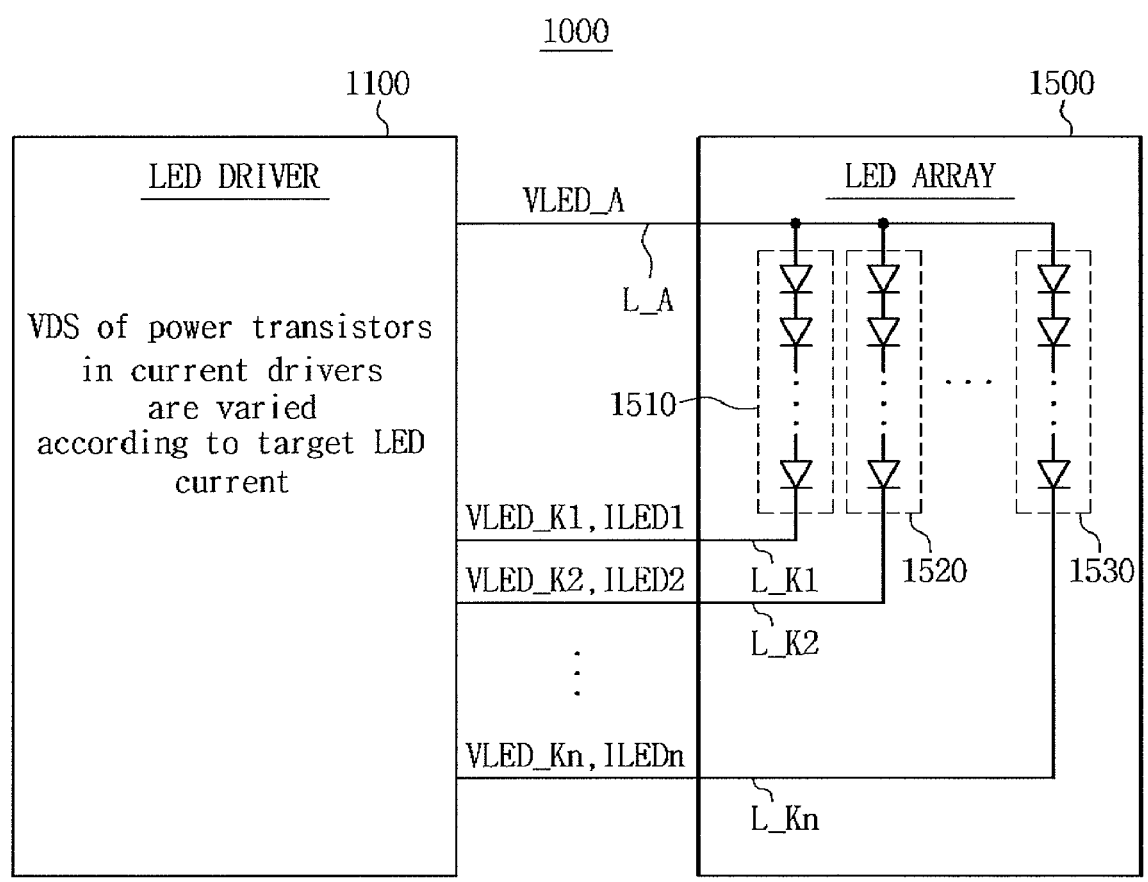
FIG. 1 illustrates a block diagram of a light-emitting-diode system according to an example embodiment.

Korean Patent Application No. 10-2009-0107714, filed on Nov. 9, 2009, in the Korean Intellectual Property Office, and entitled: "Circuit and Method of Driving Light Emitting Diodes, and Light Emitting Diode System Having the Same," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Detailed illustrative embodiments are disclosed herein. However, specific structural and functional details disclosed herein are merely representative for purposes of describing example embodiments. This invention, however, may be embodied in many alternate forms and should not be construed as limited to only example embodiments set forth herein. Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the invention.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. Spatially relative terms, such as "beneath," "below," "lower," "above," "upper" and the like, may be used herein for ease of description to describe one element or a relationship between a feature and another element or feature as illustrated in the figures. It will be understood that the spatially relative terms are intended to encompass different orientations of the device in use or operation in addition to the orientation depicted in the Figures. For example, if the device in the figures is turned over, elements described as "below" or "beneath" other elements or features would then be oriented "above" the other elements or features. Thus, for example, the term "below" can encompass both an orientation which is above as well as below. The device may be otherwise oriented (rotated 90 degrees or viewed or referenced at other orientations) and the spatially relative descriptors used herein should be interpreted accordingly.

Example embodiments are described herein with reference to cross-sectional illustrations that are schematic illustrations of idealized embodiments (and intermediate structures). As such, variations from the shapes of the illustrations as a result, for example, of manufacturing techniques and/or tolerances, may be expected. Thus, example embodiments should not be construed as limited to the particular shapes of regions illustrated herein but may include deviations in shapes that result, for example, from manufacturing. For example, an implanted region illustrated as a rectangle may have rounded or curved features and/or a gradient (e.g., of implant concentration) at its edges rather than an abrupt change from an implanted region to a non-implanted region. Likewise, a buried region formed by implantation may result in some implantation in the region between the buried region and the surface through which the implantation may take place. Thus, the regions illustrated in the figures are schematic in nature and their shapes do not necessarily illustrate the actual shape of a region of a device and do not limit the scope.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

FIG. 1 illustrates a block diagram of a light-emitting-diode system 1000 according to an example embodiment.

In the example shown in FIG. 1, the light-emitting-diode system 1000 includes a light-emitting-diode driving circuit 1100 and a light-emitting-diode array 1500.

In the example illustrated in FIG. 1, the light-emitting-diode array 1500 emits light in response to a light-emitting-diode driving voltage VLED_A. The light-emitting-diode driving circuit 1100 generates the light-emitting-diode driving voltage VLED_A, and changes drain-source voltages of power transistors. The light-emitting-diode driving circuit 1100 controls current signals flowing through light-emitting-diode strings 1510, 1520, and 1530, which are included in the light-emitting-diode array 1500, based on information of a light-emitting-diode current. The information of the light-emitting-diode current may be a target light-emitting-diode current that may be controlled inside of a semiconductor integrated circuit including the light-emitting-diode driving circuit 1100, or controlled outside of the semiconductor integrated circuit by users. The currents flowing through the power transistors correspond to currents flowing through each of the light-emitting-diode strings 1510, 1520, and 1530.

In the example illustrated in FIG. 1, first terminals L_K1, L_K2, . . . , L_Kn are coupled to drains of each of the power transistors included in the light-emitting-diode driving circuit 1100. Voltages of the first terminals L_K1, L_K2, . . . , L_Kn are respectively denoted by VLED_K1, VLED_K2, . . . , VLED_Kn, and currents flowing from each of the first terminals L_K1, L_K2, . . . , L_Kn to drains of each of the power transistors included in the light-emitting-diode driving circuit 1100 are respectively denoted by ILED1, ILED2, . . . , ILEDn. Second terminals L_A of each of the light-emitting-diode strings 1510, 1520, and 1530 are electrically coupled to each other.

The light-emitting-diode array 1500 may include at least one light-emitting-diode string. Each of the light-emitting-diode strings 1510, 1520, and 1530 may include at least one light-emitting diode, e.g., two or more light-emitting diodes coupled in series.

Figure 2:
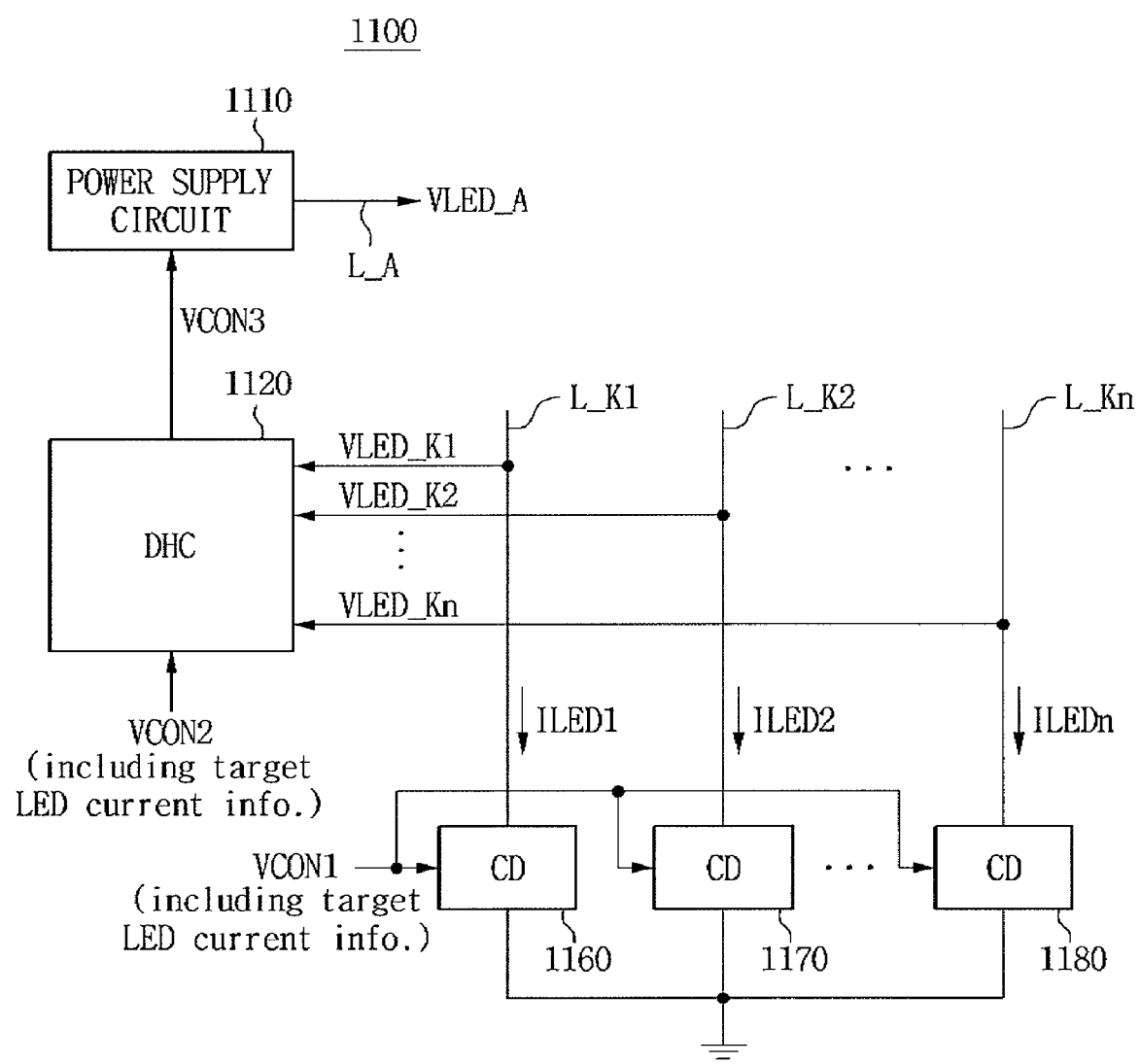
FIG. 2 illustrates a block diagram of an example of a light-emitting-diode driving circuit according to an example embodiment included in the light emitting diode system of FIG. 1.

FIG. 2 illustrates a block diagram of an example of a light-emitting-diode driving circuit 1100 according to an embodiment included in the light emitting diode system 1000 of FIG. 1.

In the example shown in FIG. 2, the light-emitting-diode driving circuit 1100 includes a power supply circuit 1110, a dynamic headroom controller 1120, and a current driving circuit.

In the example shown in FIG. 2, the current driving circuit includes current drivers 1160, 1170, and 1180, and controls current signals ILED1, ILED2, . . . , ILEDn flowing through light-emitting-diode strings 1510, 1520, and 1530 in FIG. 1 in response to a first control signal VCON1 that includes information of a light-emitting-diode current.

In the example shown in FIG. 2, the dynamic headroom controller 1120 generates a third control signal VCON3 that changes according to a change of the current signals flowing through the light-emitting-diode strings 1510, 1520, and 1530 in FIG. 1 based on the voltage signals VLED_K1, VLED_K2, . . . , VLED_Kn of the first terminals L_K1, L_K2, . . . , L_Kn of each of the light-emitting-diode strings 1510, 1520, and 1530 in FIG. 1 and a second control signal VCON2 that includes the information of the light-emitting-diode current.

In the example shown in FIG. 2, the power supply circuit 1110 generates a light-emitting-diode driving voltage VLED_A that changes in response to the third control signal VCON3, and provides the light-emitting-diode driving voltage VLED_A to second terminals L_A of each of the light-emitting-diode strings.

Figure 3:
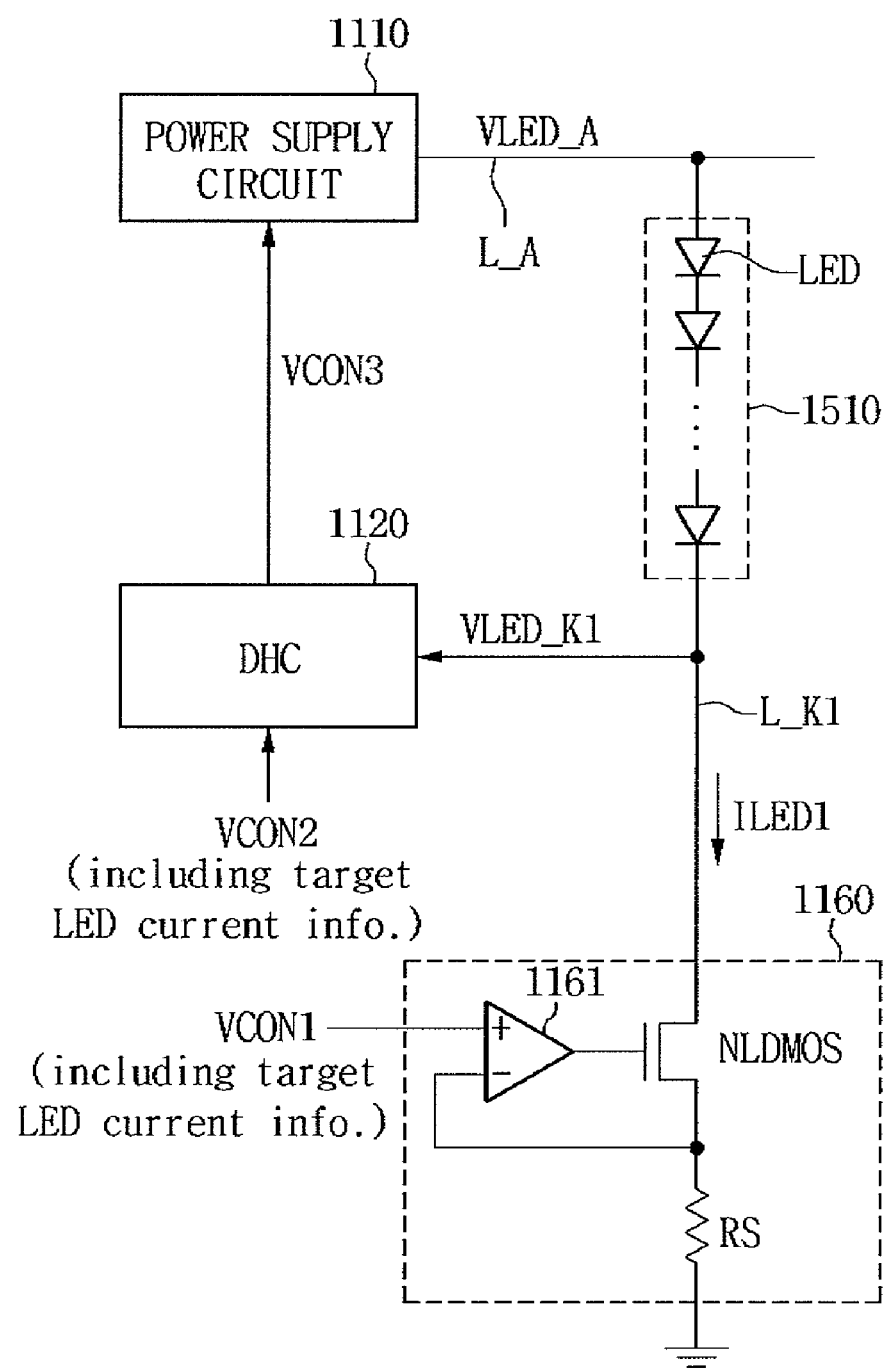
FIG. 3 illustrates a circuit diagram of the light-emitting-diode driving circuit shown in FIG. 2 in which a current driver is drawn in detail.

FIG. 3 illustrates a circuit diagram of the light-emitting-diode driving circuit 1100a according to FIG. 2 in which a current driver 1160 is drawn in detail. In FIG. 3, the light-emitting-diode driving circuit 1100a includes one current driver 1160, but the light-emitting-diode driving circuit may include a plurality of current drivers coupled to each of a plurality of light-emitting-diode strings.

In the example shown in FIG. 3, the current driver 1160 of the light-emitting-diode driving circuit 1100a includes an amplifier 1161, an N-type lateral double-diffused metal oxide semiconductor (LDMOS) transistor NLDMOS, and a resistor RS.

In the example shown in FIG. 3, the amplifier 1161 may be a differential amplifier, and amplifies a difference between the first control signal VCON1, which includes information of a light-emitting-diode current, and a feedback signal. The N-type LDMOS transistor NLDMOS has a gate connected to an output terminal of the amplifier 1161, a drain electrically connected to a light-emitting-diode string 1510, and a source from which the feedback signal is output. The resistor RS is coupled between the source of the N-type LDMOS transistor NLDMOS and the ground, and determines a magnitude of a drain current of the N-type LDMOS transistor NLDMOS.

In the example shown in FIG. 3, the N-type LDMOS transistor NLDMOS is shown as a switching transistor constituting the current driver 1160, but the switching transistor may be an arbitrary power transistor such as a power MOS field effect transistor (MOSFET) or an insulated gate bipolar transistor (IGBT).

Figure 4:
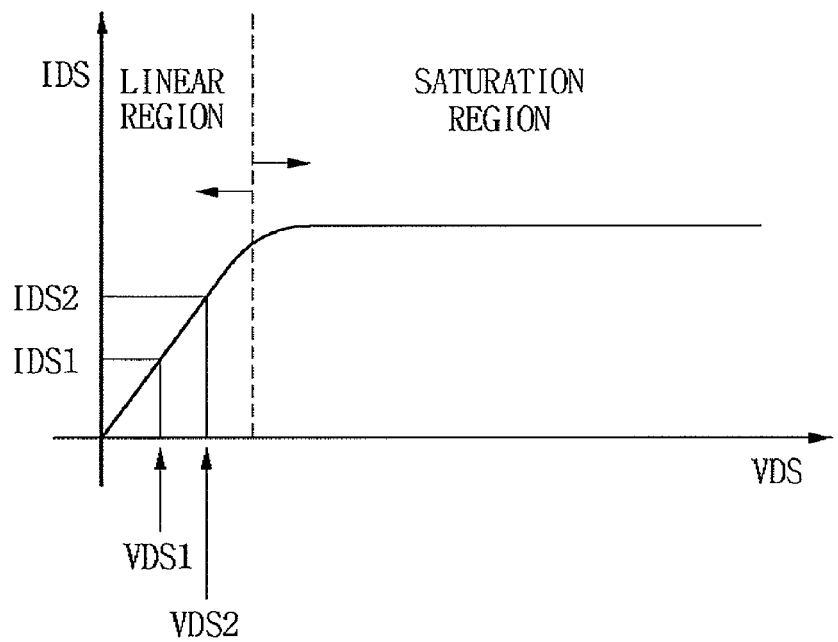
FIG. 4 illustrates a graph of a relationship between a drain-source voltage and a drain current of an LDMOS transistor constructing the current driver in FIG. 3.

FIG. 4 illustrates a graph of a relationship between a drain-source voltage VDS and a drain current IDS of an LDMOS transistor NLDMOS included in the current driver 1160 in FIG. 3.

Referring to FIG. 4, the drain current IDS increases as the drain-source voltage VDS increases in the linear region in which the drain-source voltage VDS is low, and the drain current IDS maintains constant value even if the drain-source voltage VDS increases in the saturation region in which the drain-source voltage VDS is high. In the linear region, when the drain-source voltage VDS is very low, the N-type LDMOS transistor NLDMOS operates in a triode region in which the drain current IDS is directly proportional to the drain-source voltage VDS. In the triode region, the N-type LDMOS transistor NLDMOS functions as a resistor.

For example, when the light-emitting-diode driving circuit 1100a has a specification that the resistance of the resistor RS of the current driver 1160 of is 5Ω and a drain current of the N-type LDMOS transistor NLDMOS is 40 mA, a voltage across the resistor RS is 200 mV. When a drain voltage of the N-type LDMOS transistor NLDMOS, i.e., the voltage signal VLED_K1 of the first terminal L_K1 of the light-emitting-diode string 1510, is 500 mV, a voltage of 300 mV is dropped between a drain and a source of the N-type LDMOS transistor NLDMOS. In the VDS-IDS curve of FIG. 4, when VDS2 is 500 mV and IDS is 40 mA, if the drain voltage of the N-type LDMOS transistor NLDMOS, i.e., the voltage signal VLED_K1 of the first terminal L_K1 of the light-emitting-diode string 1510, changes from 500 mV (VDS2) to 400 mV (VDS1), a current of 40 mA may not flow through the N-type LDMOS transistor NLDMOS. In this condition, in the conventional art, an N-type LDMOS transistor NLDMOS having a bigger size is needed for 40 mA to flow through the N-type LDMOS transistor NLDMOS.

The light-emitting-diode driving circuit 1100 according to an example embodiment changes the drain-source voltage from VDS1 to VDS2 when a drain current of the N-type LDMOS transistor NLDMOS changes from IDS1 to IDS2. Therefore, the light-emitting-diode driving circuit 1100 shown in FIG. 1 operates following the characteristic curve of the N-type LDMOS transistor NLDMOS shown in FIG. 4 without increasing the size of the N-type LDMOS transistor NLDMOS. Therefore, the size of the N-type LDMOS transistor NLDMOS may not need to be increased even if a target light-emitting-diode current input from the exterior is increased.

Figure 5:
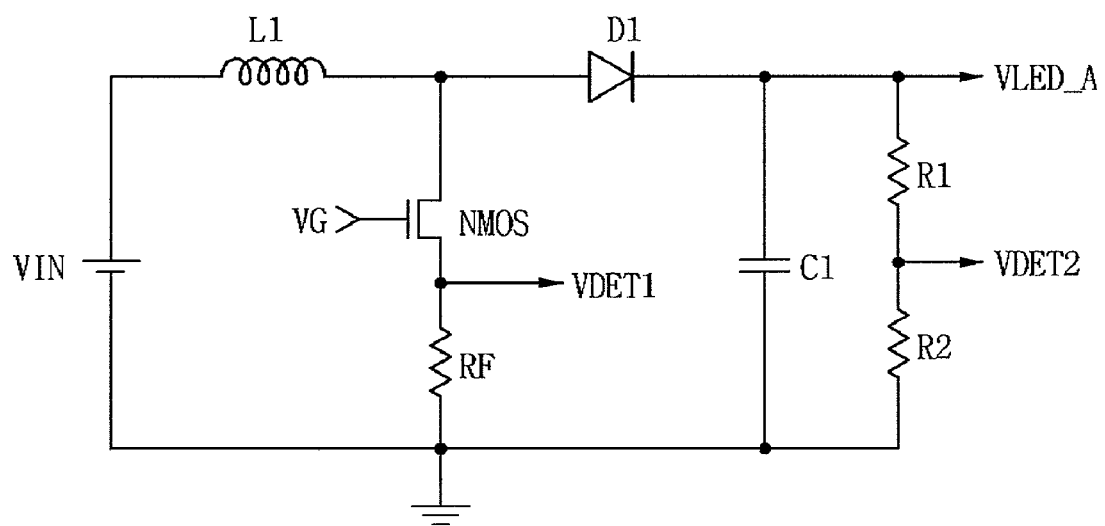
FIG. 5 illustrates a circuit diagram of an example of a power supply circuit included in the light-emitting-diode driving circuit of FIG. 2.

FIG. 5 illustrates a circuit diagram of an example of the power supply circuit 1110 included in the light-emitting-diode driving circuit 1100 of FIG. 2.

In the example shown in FIG. 5, the power supply circuit 1110 is a kind of DC-DC converter and a boost converter receiving a DC input voltage VIN to output a stable high DC voltage. In the example shown in FIG. 5, the power supply circuit 1110 includes an inductor L1, a first resistor RF, an NMOS power transistor NMOS, a diode D1, a capacitor C1, a second resistor R1, and a third resistor R2.

Hereinafter, an example of operation of the power supply circuit 1110 of FIG. 5 will be described.

First, during the active period of a gate control signal VG, in which the gate control signal VG is in a logic high state, NMOS power transistor NMOS is turned on and a current flows through the inductor L1, the NMOS power transistor NMOS, and the first resistor RF. In this condition, the inductor L1 converts an electric energy into the form of magnetic energy corresponding to a current and stores the magnetic energy. Therefore, the longer the active period of the gate control signal VG is, the more the magnetic energy stored in the inductor L1.

Next, during the inactive period of the gate control signal VG, in which the gate control signal VG is in a logic low state, NMOS power transistor NMOS is turned off, and the magnetic energy stored in the inductor L1 during the active period of the gate control signal VG is converted into the form of electric energy. Thus, the inductor L1 generates a current by an electromotive force due to a magnitude of the stored magnetic energy, and the current flows through the diode D1, the second resistor R1, and the third resistor R2. The magnetic energy stored in the inductor L1 decreases at the same speed as the speed of the increase of the magnetic energy. Meanwhile, the light-emitting-diode driving voltage VLED_A is generated at the output node, i.e., at one end of the second resistor R1, by the electromotive force of the inductor L1 and the input voltage VIN. Further, the light-emitting-diode driving voltage VLED_A is charged in the capacitor C1 connected between the output node and the ground. If the magnetic energy stored in the inductor L1 during the active period of the gate control signal VG is large, the electromotive force of the inductor L1 is large, and therefore the light-emitting-diode driving voltage VLED_A is more boosted.

Next, when the gate control signal VG activates again, the current flows through the NMOS power transistor NMOS and the first resistor RF, and the magnetic energy is stored in the inductor L1. At this time, the voltage level of the light-emitting-diode driving voltage VLED_A is maintained by the voltage stored in the capacitor C1.

In the example described above, the power supply circuit 1110 increases the electromotive force of the inductor L1 to increase the light-emitting-diode driving voltage VLED_A when a duty ratio of the gate control signal VG is high, and decreases the electromotive force of the inductor L1 to decrease the light-emitting-diode driving voltage VLED_A when a duty ratio of the gate control signal VG is low.

In the example shown in FIG. 5, the duty ratio of the gate control signal VG is changed based on a first detection voltage VDET1 (corresponding to a current flowing through the NMOS power transistor NMOS) and a second detection voltage VDET2 (which is a sensed voltage of the light-emitting-diode driving voltage VLED_A). When the light-emitting-diode driving voltage VLED_A is lower than a target voltage, the power supply circuit 1110 increases the duty ratio of the gate control signal VG to boost the light-emitting-diode driving voltage VLED_A by increasing the electromotive force of the inductor L1. Conversely, when the light-emitting-diode driving voltage VLED_A is higher than the target voltage, the power supply circuit 1110 decreases the duty ratio of the gate control signal VG to lower the light-emitting-diode driving voltage VLED_A by decreasing the electromotive force of the inductor L1.

Figure 6:
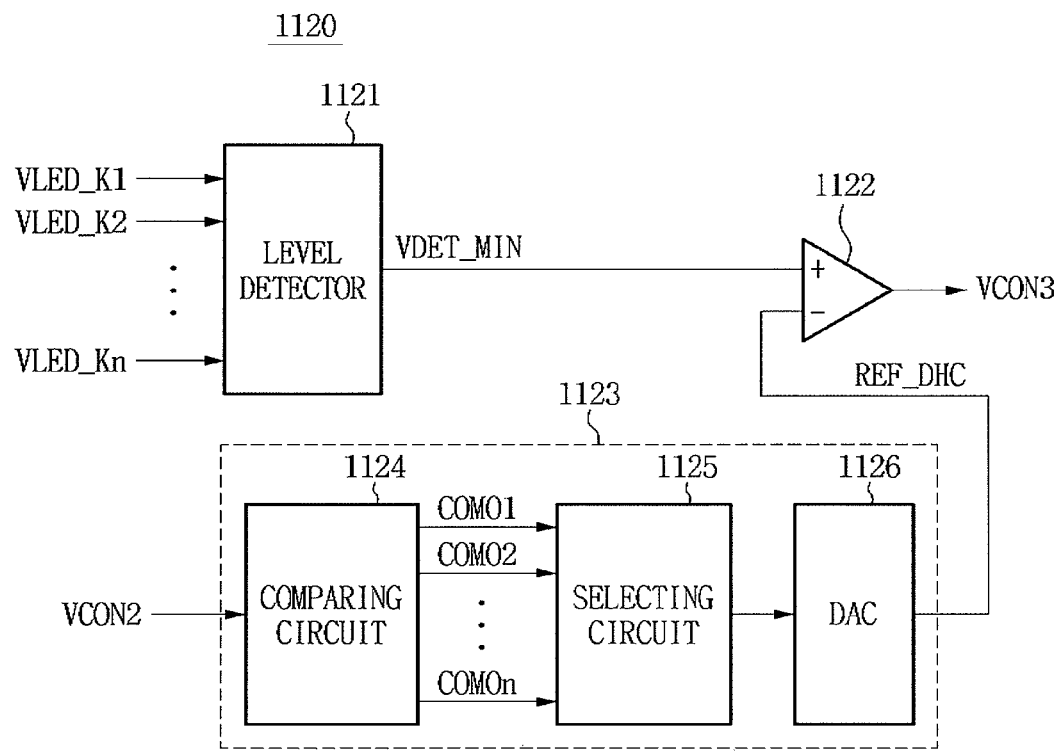
FIG. 6 illustrates a circuit diagram of an example of a dynamic headroom controller included in the light-emitting-diode driving circuit of FIG. 2.

FIG. 6 illustrates a circuit diagram of an example of a dynamic headroom controller 1200 included in the light-emitting-diode driving circuit 1100 of FIG. 2.

In the example shown in FIG. 6, the dynamic headroom controller 1120 includes a level detector 1121, a reference voltage generating circuit 1123, and a comparator 1122. The level detector 1121 detects the voltage levels of the voltage signals VLED_K1, VLED_K2, . . . , VLED_Kn of the first terminals L_K1, L_K2, . . . , L_Kn of each of the light-emitting-diode strings 1510, 1520, and 1530 in FIG. 1, and generates a minimum detection voltage signal VDET_MIN having a minimum voltage level of the detected voltage levels. The reference voltage generating circuit 1123 generates a first reference voltage REF_DHC that changes in response to the second control signal VCON2. The comparator 1122 compares the minimum detection voltage signal VDET_MIN with the first reference voltage REF_DHC to generate the third control signal VCON3.

In the example shown in FIG. 6, the reference voltage generating circuit 1123 includes a comparing circuit 1124, a selecting circuit 1125, and a digital-to-analog converter 1126. The comparing circuit 1124 compares the second control signal VCON2 with at least one output reference voltage having different voltage levels from each other to generate at least one comparison output voltage signal COMO1, COMO2, . . . , COMOn. The selecting circuit 1125 selects one of the comparison output voltages COMO1, COMO2, . . . , COMOn. The digital-to-analog converter 1126 performs digital-to-analog conversion with respect to an output signal of the selecting circuit 1125 to generate the first reference voltage REF_DHC.

Figure 7:
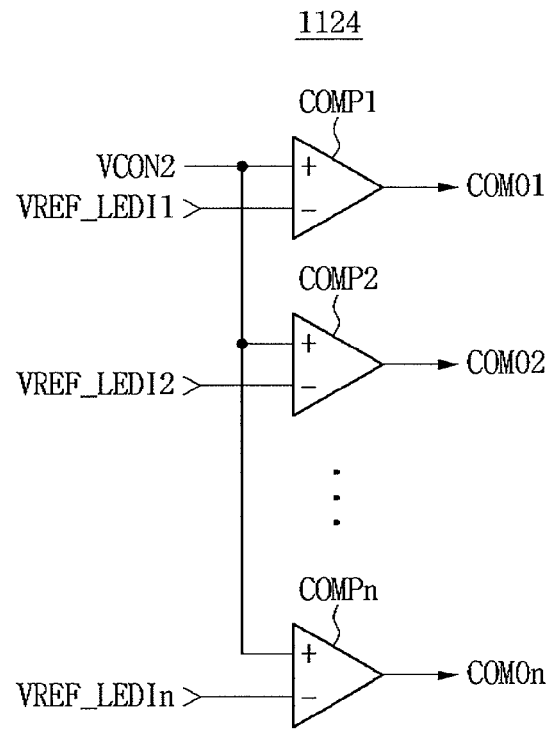
FIG. 7 illustrates a circuit diagram of an example of a comparing circuit included in the dynamic headroom controller of FIG. 6.

FIG. 7 illustrates a circuit diagram of an example of the comparing circuit 1124 included in the dynamic headroom controller 1120 of FIG. 6.

In the example shown in FIG. 7, the comparing circuit 1124 includes at least one comparator COMP1, COMP2, . . . , COMPn that compares the second control signal VCON2 with respective output reference voltages VREF_LEDI1, VREF_LEDI2, . . . , VREF_LEDIn to generate the comparison output voltages COMO1, COMO2, . . . , COMOn.

Figure 8:
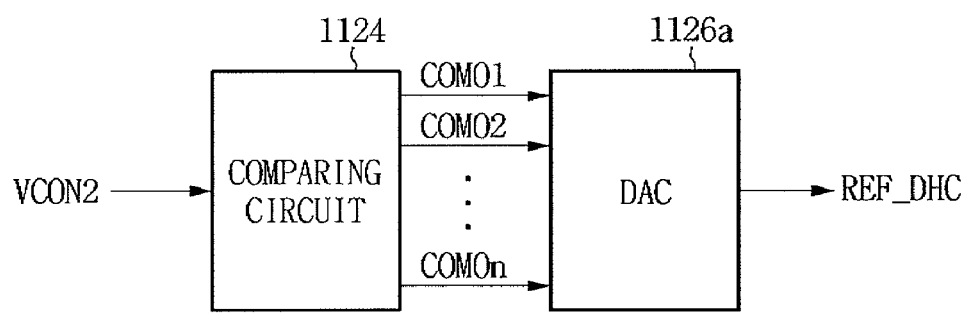
FIG. 8 illustrates a circuit diagram of an example of a reference voltage generating circuit included in the dynamic headroom controller of FIG. 6.

FIG. 8 illustrates a circuit diagram of an example of the reference voltage generating circuit 1123 included in the dynamic headroom controller 1120 of FIG. 6.

In the example shown in FIG. 8, the reference voltage generating circuit 1123a includes a comparing circuit 1124 and a digital-to-analog converter 1126a. The comparing circuit 1124 compares the second control signal VCON2 with at least one output reference voltage having different voltage levels from each other to generate at least one comparison output voltage signal COMO1, COMO2, . . . , COMOn. The digital-to-analog converter 1126a performs digital-to-analog conversion with respect to the comparison output voltage signals COMO1, COMO2, . . . , COMOn to generate the first reference voltage REF_DHC.

Figure 9:
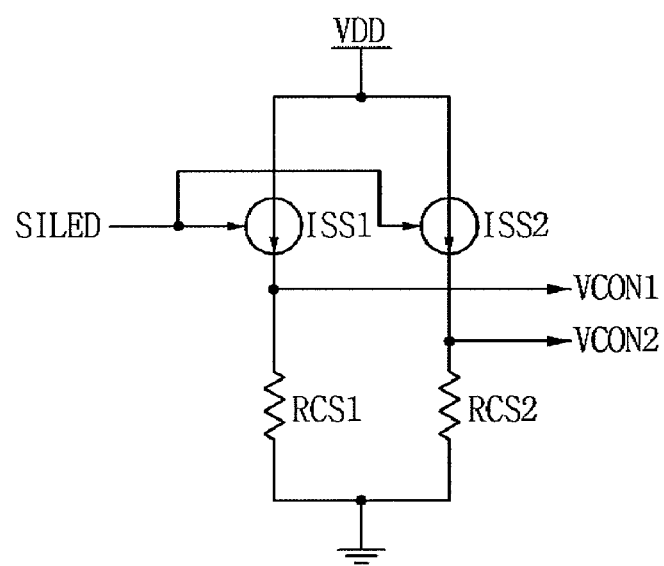
FIG. 9 illustrates a circuit diagram of an example of a circuit that generates control signals having information of a light-emitting-diode current that is input to the light emitting diode driving circuit of FIG. 2.

FIG. 9 illustrates a circuit diagram of an example of a circuit that generates control signals having information of a light-emitting-diode current that is input to the light emitting diode driving circuit 1100 of FIG. 2.

In the example shown in FIG. 9, a control signal generating circuit 1010 includes a first current source ISS1, a first resistor RCS1, a second current source ISS2 and a second resistor RCS2. The first current source ISS1 and the first resistor RCS1 are connected in series, and coupled between the supply voltage VDD and the ground. The second current source ISS2 and the second resistor RCS2 are connected in series, and coupled between the supply voltage VDD and the ground. The first control signal VCON1 is output from a connecting point of the first current source ISS1 and the first resistor RCS1, and the second control signal VCON2 is output from a connecting point of the second current source ISS2 and the second resistor RCS2.

The example control signal generating circuit 1010 shown in FIG. 9 generates the first control signal VCON1 by controlling a current of the first current source ISS1, and generates the second control signal VCON2 by controlling a current of the second current source ISS2 in response to an information signal of a light-emitting-diode current SILED.

The information signal of a light-emitting-diode current SILED is a target signal that adjusts the brightness of a light-emitting-diode array. The information signal of a light-emitting-diode current SILED may be generated inside of a semiconductor integrated circuit including the light-emitting-diode driving circuit 1100, or outside of the semiconductor integrated circuit, and may be controlled by users. In a liquid crystal display (LCD) device used in a computer or a television set, the brightness of a screen may be adjusted by controlling the brightness of a light-emitting-diode array of a back-light according to intensity of image signals.

Figure 10:
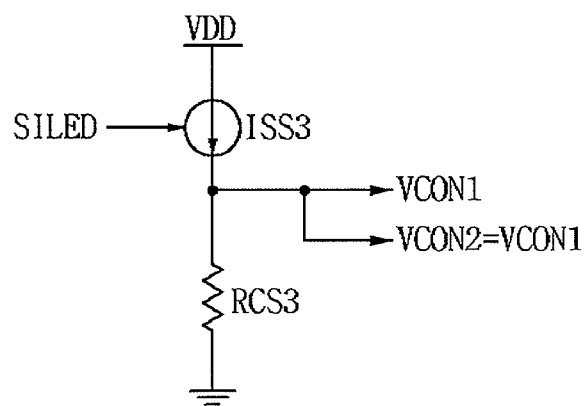
FIG. 10 illustrates a circuit diagram of another example of a circuit that generates control signals having information of a light-emitting-diode current that is input to the light emitting diode driver of FIG. 2.

FIG. 10 illustrates a circuit diagram of another example of a circuit that generates control signals having information of a light-emitting-diode current that is input to the light emitting diode driver of FIG. 2.

In the example shown in FIG. 10, a control signal generating circuit 1010a includes a third current source ISS3 and a third resistor RCS3. The third current source ISS3 and the third resistor RCS3 are connected in series, and coupled between the supply voltage VDD and the ground. The first control signal VCON1 and the second control signal VCON2 are output from a connecting point of the third current source ISS3 and the third resistor RCS3.

The control signal generating circuit 1010a shown in FIG. 10 generates the first control signal VCON1 and the second control signal VCON2 by controlling a current of the third current source ISS3 in response to an information signal of a light-emitting-diode current SILED. In the control signal generating circuit 1010a shown in FIG. 10, the first control signal VCON1 and the second control signal VCON2 have the same magnitude.

Figure 11:
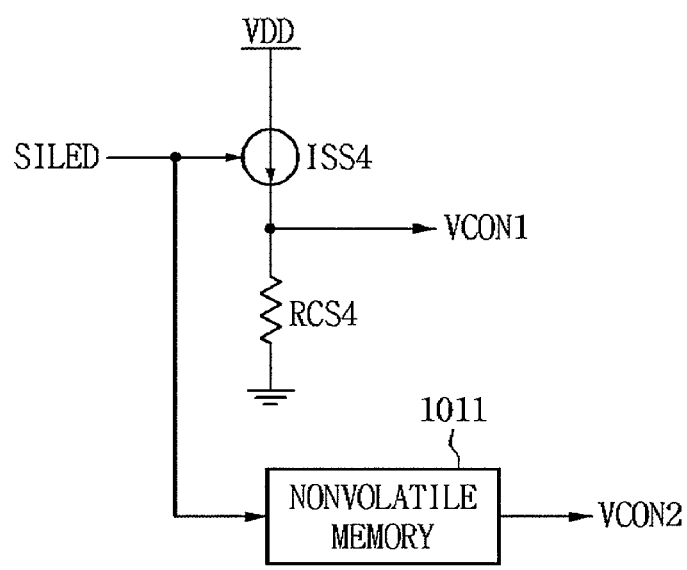
FIG. 11 illustrates a circuit diagram of still another example of a circuit that generates control signals having information of a light-emitting-diode current that is input to the light emitting diode driver of FIG. 2.

FIG. 11 illustrates a circuit diagram of still another example of a circuit that generates control signals having information of a light-emitting-diode current that is input to the light emitting diode driver of FIG. 2.

In the example shown in FIG. 11, a control signal generating circuit 1010b includes a fourth current source ISS4, a fourth resistor RCS4, and a memory device 1011. The fourth current source ISS4 and the fourth resistor RCS4 are connected in series, and coupled between the supply voltage VDD and the ground. The first control signal VCON1 is output from a connecting point of the fourth current source ISS4 and the fourth resistor RCS4, and second control signal VCON2 is output from the memory device 1011.

The control signal generating circuit 1010b shown in FIG. 11 generates the first control signal VCON1 by controlling a current of the fourth current source ISS4 in response to an information signal of a light-emitting-diode current SILED, and outputs the second control signal VCON2 from the memory device 1011 in which the information signal of a light-emitting-diode current SILED is stored.

Each of the control signal generating circuits 1010, 1010a, and 1010b may be included in one semiconductor integrated circuit with the light-emitting-diode driving circuit 1100.

Figure 12:
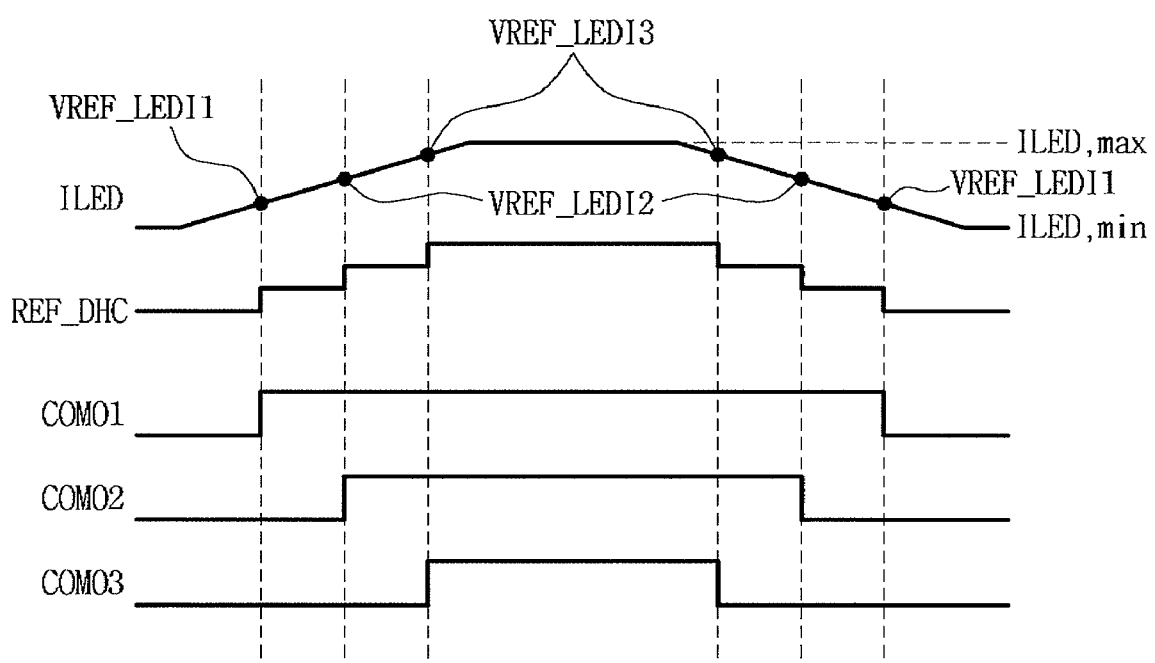
FIG. 12 illustrates a timing diagram of an example operation of the light-emitting-diode system of FIG. 1.

FIG. 12 illustrates a timing diagram of an example operation of the light-emitting-diode system 1000 of FIG. 1. In FIG. 12, the operation of the light-emitting-diode system 1000 is illustrated when the comparison output voltage signals COMO1, COMO2, and COMO3 are generated by comparing the second control signal VCON2 with each of three output reference voltages VREF_LEDI1, VREF_LEDI2, and VREF_LEDI3.

Referring to FIG. 12, the voltage level of the first reference voltage REF_DHC that is input to the comparator 1122 is changed in response to the output signals COMO1, COMO2, and COMO3 of the comparing circuit 1124 included in the reference voltage generating circuit 1123 in FIG. 6, and the magnitude of the current ILED flowing through each of the light-emitting-diode strings in response to the first reference voltage REF_DHC. In FIG. 12, VREF_LEDI1, VREF_LEDI2 and VREF_LEDI3 are output reference voltages that are used for comparison with the second control signal VCON2 in the comparing circuit 1124. The current ILED flowing through each of the light-emitting-diode strings changes between a minimum value ILED,min and a maximum value ILED,max in response to the first reference voltage REF_DHC.

Hereinafter, an example operation of the light-emitting-diode driving circuit 1100 and the light-emitting-diode system 1000 including the light-emitting-diode driving circuit 1100 shown in FIG. 1 will be described referring to FIGS. 1-12.

In the example operation, the light-emitting-diode driving circuit 1100 generates the first reference voltage REF_DHC based on the second control signal VCON2 that includes the information of the light-emitting-diode current, receives the feedback voltage signals VLED_K1, VLED_K2, ..., VLED_Kn from the connecting points of each of the light-emitting-diode strings 1510, 1520, and 1530 in FIG. 1 and each of the power transistors, compares a voltage signal that has a minimum value of the feedback voltage signals VLED_K1, VLED_K2, ..., VLED_Kn with the first reference voltage REF_DHC, and generates the third control signal VCON3 that changes according to the change of a current signal flowing through the light-emitting-diode strings 1510, 1520, and 1530. The third control signal VCON3 changes the magnitude of the light-emitting-diode driving voltage VLED_A by changing the gate control signal VG of the NMOS power transistor NMOS included in the power supply circuit 1110.

The light-emitting-diode system 1000 shown in FIG. 1 changes the magnitude of the current flowing through the light-emitting-diode strings, and changes the voltages of the connecting points of each of the light-emitting-diode strings 1510, 1520, and 1530 and each of the power transistors in response to the first and second control signals VCON and VCON2 input from the exterior that include the information of the light-emitting-diode current. Therefore, voltages of each of the drain terminals of the power transistors increase accordingly as drain currents of the power transistors included in the current drivers 1160, 1170, and 1180 increase.

As described above, the information signal of the light-emitting-diode current SILED is a target signal that adjusts the brightness of a light-emitting-diode array, and may be controlled by users. The first control signal VCON1 and the second control signal VCON2 are signals that are generated in response to the information signal of the light-emitting-diode current SILED. The light-emitting-diode system 1000 generates the control signal VCON1 and the second control signal VCON2 in response to the information signal of the light-emitting-diode current SILED, and adjusts the brightness of the light-emitting-diode array based on the control signal VCON1 and the second control signal VCON2.

Referring to FIG. 4, when a drain current of the N-type LDMOS transistor NLDMOS changes from IDS1 to IDS2, the light-emitting-diode system 1000 increases a magnitude of the light-emitting-diode driving voltage VLED_A in response to the second control signal VCON2 that is input to the dynamic headroom controller 1120. Therefore, voltages of each of the drain terminals of the power transistors change from VDS 1 to VDS2. Even if the magnitude of the information signal of the light-emitting-diode current SILED increases, the light-emitting-diode driving circuit 1100 shown in FIG. 1 operates following the VDS-IDS curve shown in FIG. 4 in the triode region, without requiring an increase in the size of the power transistors included in the current drivers 1160, 1170, and 1180.

The dynamic headroom controller 1120 of the light-emitting-diode driving circuit 1100 according to example embodiments detects the minimum detection voltage signal VDET_MIN having a minimum voltage level of the voltage signals VLED_K1, VLED_K2, ..., VLED_Kn of the first terminals L_K1, L_K2, ..., L_Kn of each of the light-emitting-diode strings 1510, 1520, and 1530 in FIG. 1, and compares the minimum detection voltage signal VDET_MIN with the first reference voltage REF_DHC to generate the third control signal VCON3. Therefore, the voltage signals VLED_K1, VLED_K2, ..., VLED_Kn of the first terminals L_K1, L_K2, ..., L_Kn of each of the light-emitting-diode strings 1510, 1520, and 1530 in FIG. 1 have a higher value than the minimum detection voltage signal VDET_MIN. For example, when VLED_K1 is the minimum detection voltage signal VDET_MIN, the dynamic headroom controller 1120 compares VLED_K1 with the first reference voltage REF_DHC to generate the third control signal VCON3. The power supply circuit 1110 receives the third control signal VCON3, controls a switching frequency and a duty ratio of the power transistor included in the power supply circuit 1110, and generates light-emitting-diode driving voltage VLED_A. Therefore, VLED_K1 maintains a voltage in which the information signal of the light-emitting-diode current is included, and the rest of the voltage signals VLED_K2, ..., VLED_Kn maintain larger values than VLED_K1.

Accordingly, as described with reference to FIG. 4, when a target light-emitting-diode current is increased, the voltage signals VLED_K1, VLED_K2, ..., VLED_Kn of the first terminals L_K1, L_K2, ..., L_Kn of each of the light-emitting-diode strings 1510, 1520, and 1530 in FIG. 1 increase, then the drain-source voltages of the power transistors included in the current drivers 1160, 1170, and 1180 increase, and the light-emitting-diode driving circuit 1100 shown in FIG. 1 operates following the VDS-IDS curve shown in FIG. 4. Therefore, an increase in the size of the power transistors included in the current drivers 1160, 1170, and 1180 may be avoided even if a target light-emitting-diode current is increased.

In contrast, a general power transistor such as a lateral double-diffused metal oxide semiconductor (LDMOS) that controls current flowing through light-emitting diodes may occupy a large portion of a semiconductor chip in which a light-emitting-diode driving circuit is included. Further, the light-emitting-diode current driver may be required to have a fast switching time. However, when the size of a general power transistor used in the light-emitting-diode current driver is large, the parasitic capacitance becomes large and the switching speed becomes slow.

Figure 13:
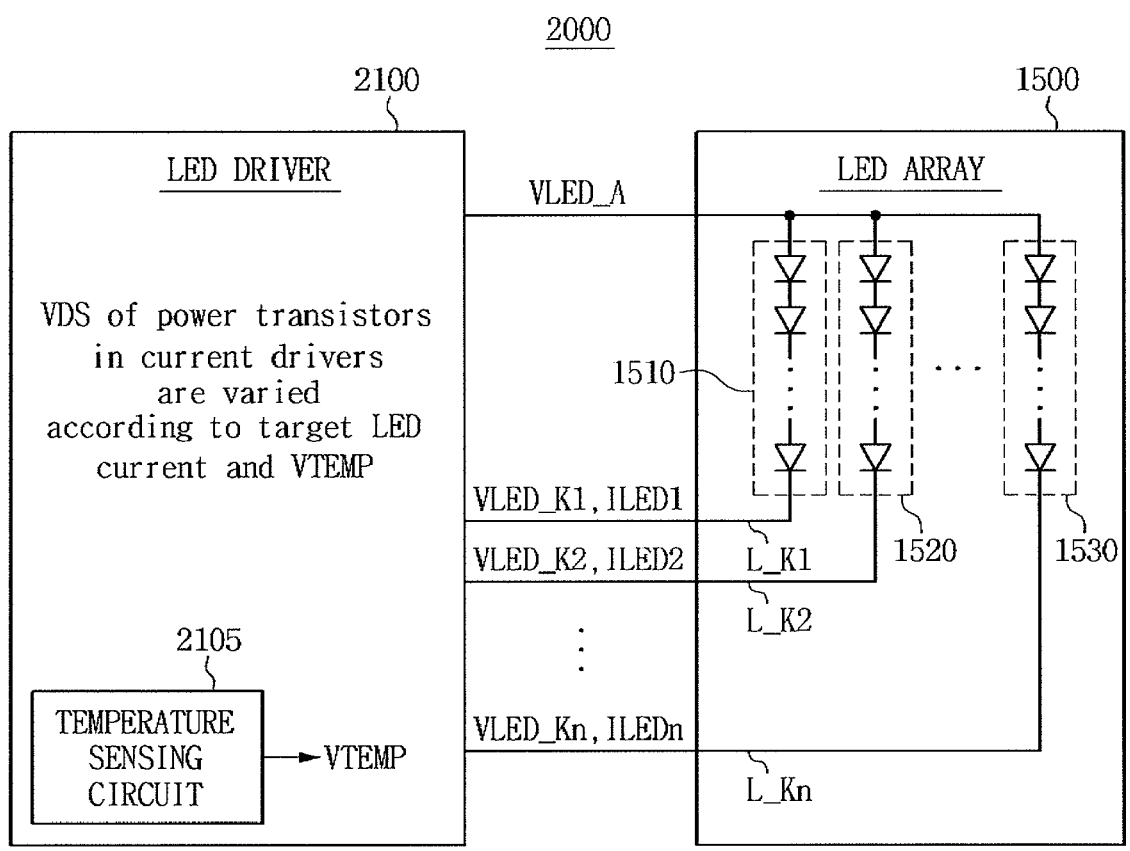
FIG. 13 illustrates a block diagram of a light-emitting-diode system according to another example embodiment.

FIG. 13 illustrates a block diagram of a light-emitting-diode system 2000 according to another example embodiment.

In the example shown in FIG. 13, the light-emitting-diode system 2000 includes a light-emitting-diode driving circuit 2100 and a light-emitting-diode array 1500. In FIG. 13, the light-emitting-diode array 1500 has the same structure as the light-emitting-diode array 1500 included in the light-emitting-diode system 1000 of FIG. 1.

In the example shown in FIG. 13, the light-emitting-diode array 1500 emits light in response to the light-emitting-diode driving voltage VLED_A. The light-emitting-diode driving circuit 2100 generates the light-emitting-diode driving voltage VLED_A, and changes drain-source voltages of power transistors. The light-emitting-diode driving circuit 2100 controls current signals flowing through the light-emitting-diode strings 1510, 1520, and 1530 of the light-emitting-diode array 1500 based on information of a light-emitting-diode current and a temperature sensing voltage signal that includes information of a semiconductor chip temperature. The currents flowing through the power transistors correspond to currents flowing through each of the light-emitting-diode strings 1510, 1520, and 1530.

In the example shown in FIG. 13, the light-emitting-diode system 2000 includes a temperature sensing circuit 2105 that senses a temperature of a semiconductor integrated circuit in which the light-emitting-diode driving circuit 2100 is included, and generates the temperature sensing voltage signal VTEMP. The temperature sensing circuit 2105 may be located outside of the light-emitting-diode driving circuit 2100.

Figure 14:
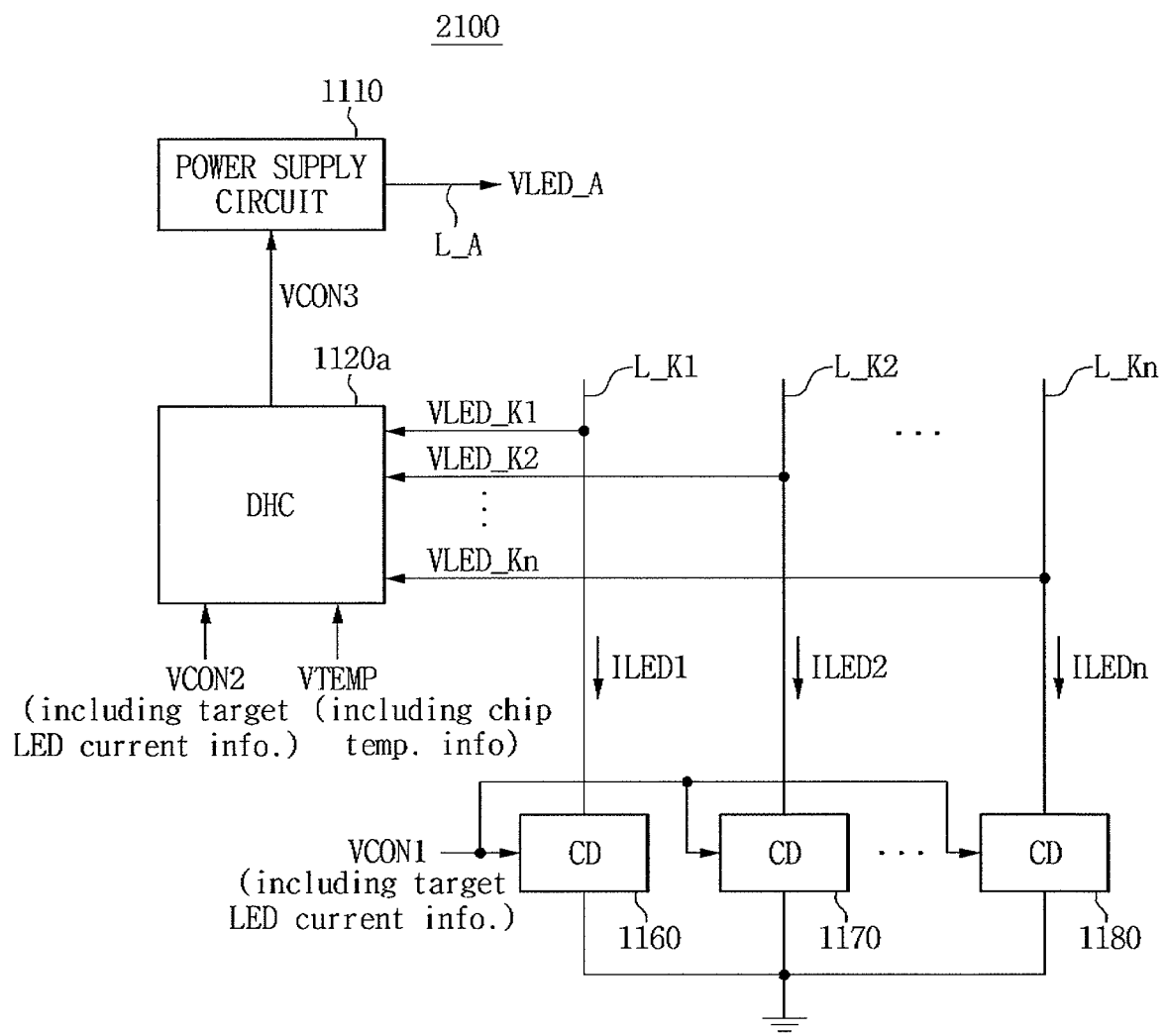
FIG. 14 illustrates a block diagram of an example of a light-emitting-diode driving circuit according to an embodiment included in the light-emitting-diode system of FIG. 13.

FIG. 14 illustrates a block diagram of an example of a light-emitting-diode driving circuit 2100 according to an embodiment included in the light-emitting-diode system 2000 of FIG. 13.

In the example shown in FIG. 14, the light-emitting-diode driving circuit 2100 includes a power supply circuit 1110, a dynamic headroom controller 1120a, and a current driving circuit. The current driving circuit includes current drivers 1160, 1170, and 1180, and controls current signals ILED1, ILED2, . . . , ILEDn flowing through light-emitting-diode strings 1510, 1520, and 1530 in FIG. 13 in response to a first control signal VCON1 that includes information of a light-emitting-diode current.

In the example shown in FIG. 14, the dynamic headroom controller 1120a generates the third control signal VCON3 (which changes according to a change of the current signals flowing through the light-emitting-diode strings 1510, 1520, and 1530 in FIG. 13 based on the voltage signals VLED_K1, VLED_K2, . . . , VLED_Kn of the first terminals L_K1, L_K2, . . . , L_Kn of each of the light-emitting-diode strings 1510, 1520, and 1530 in FIG. 1), the second control signal VCON2 (which includes the information of the light-emitting-diode current), and the temperature sensing voltage signal VTEMP (which includes information of the temperature of a semiconductor integrated circuit in which the light-emitting-diode driving circuit 2100 is integrated).

The power supply circuit 1110 generates the light-emitting-diode driving voltage VLED_A that changes in response to the third control signal VCON3, and provide the light-emitting-diode driving voltage VLED_A to the second terminals L_A of each of the light-emitting-diode strings.

Figure 15:
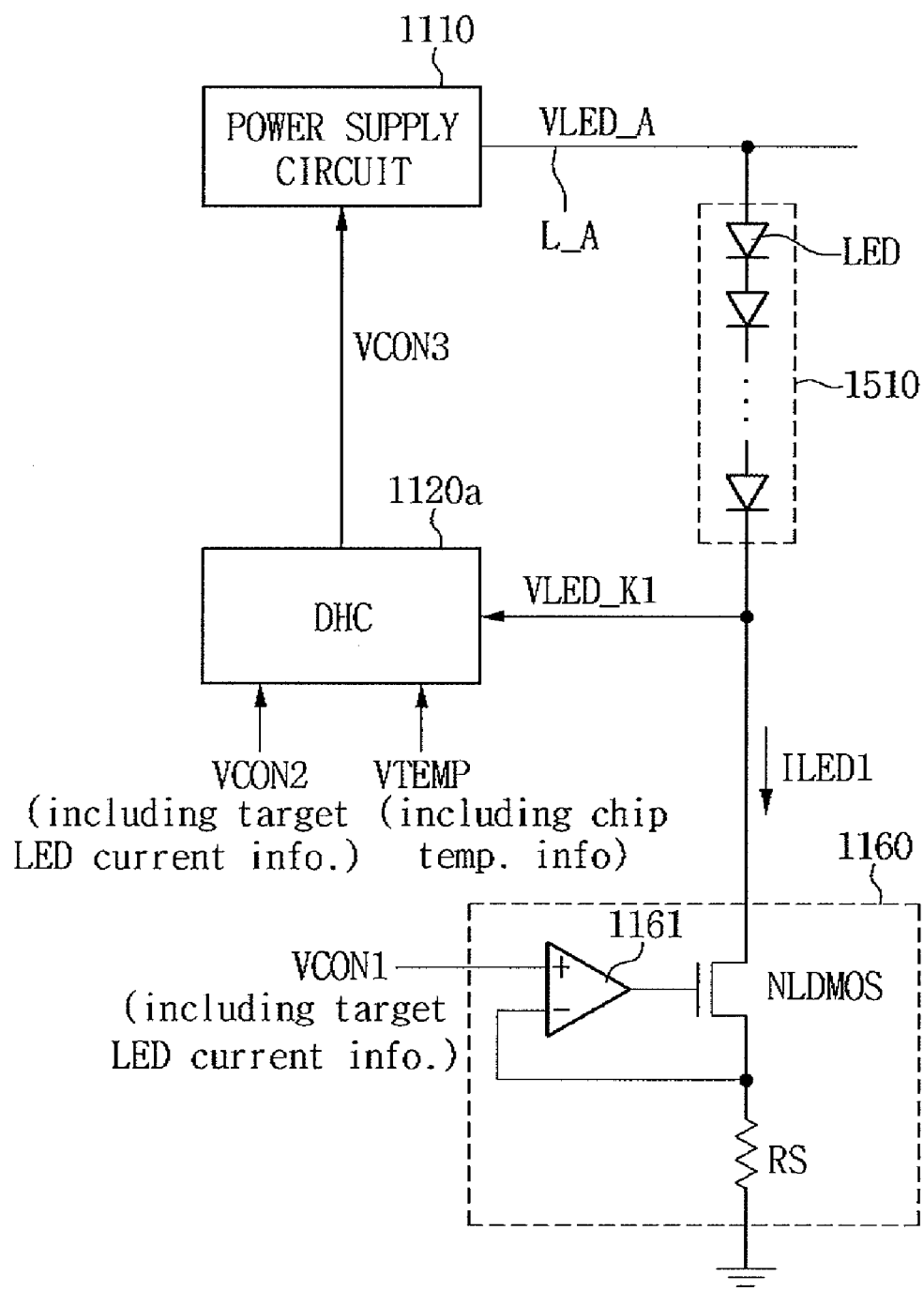
FIG. 15 illustrates a circuit diagram of the light-emitting-diode driving circuit shown in FIG. 14 in which a current driving circuit is drawn in detail.

FIG. 15 illustrates a circuit diagram of the light-emitting-diode driving circuit 2100 shown in FIG. 14 in which an example current driving circuit 1160 is drawn in detail. FIG. 15, the light-emitting-diode driving circuit 2100a includes one current driver 1160, but the light-emitting-diode driving circuit may include a plurality of current drivers coupled to each of a plurality of light-emitting-diode strings.

In the example shown in FIG. 15, the light-emitting-diode driving circuit 2100a generates the third control signal VCON3 based on not only the second control signal VCON2 but also the temperature sensing voltage signal VTEMP that includes information of the temperature of a semiconductor integrated circuit, and provides the third control signal VCON3 to the power supply circuit 1110, differently from the light-emitting-diode driving circuit 1100a shown in FIG. 3.

Figure 16:
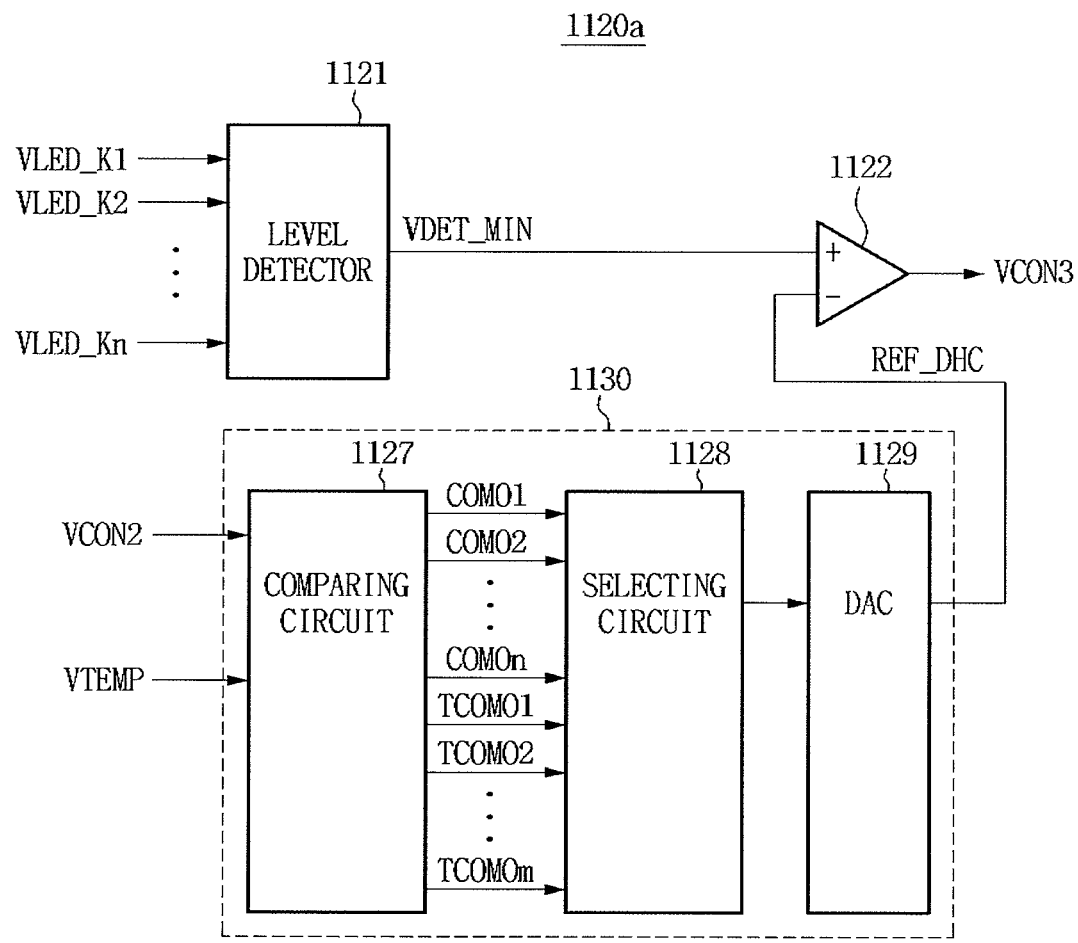
FIG. 16 illustrates a circuit diagram of an example of a dynamic headroom controller included in the light-emitting-diode driving circuit of FIG. 14.

FIG. 16 illustrates a circuit diagram of an example of a dynamic headroom controller 1120a included in the light-emitting-diode driving circuit 2100 of FIG. 14.

In the example shown in FIG. 16, the dynamic headroom controller 1120a includes a level detector 1121, a reference voltage generating circuit 1130, and a comparator 1122. The level detector 1121 detects the voltage levels of the voltage signals VLED_K1, VLED_K2, . . . , VLED_Kn of the first terminals L_K1, L_K2, . . . , L_Kn of each of the light-emitting-diode strings 1510, 1520, and 1530 in FIG. 1, and generates a minimum detection voltage signal VDET_MIN having a minimum voltage level of the detected voltage levels. The reference voltage generating circuit 1130 generates the first reference voltage REF_DHC that changes in response to the second control signal VCON2 and the temperature sensing voltage signal VTEMP. The comparator 1122 compares the minimum detection voltage signal VDET_MIN with the first reference voltage REF_DHC to generate the third control signal VCON3.

In the example shown in FIG. 6, the reference voltage generating circuit 1130 includes a comparing circuit 1127, a selecting circuit 1128, and a digital-to-analog converter 1129. The comparing circuit 1127 compares the second control signal VCON2 with at least one output reference voltage having different voltage levels from each other, and compares the temperature sensing voltage signal VTEMP with at least one temperature reference voltage having different voltage levels from each other to generate at least one comparison output voltage signal COMO1, COMO2, . . . , COMOn, TCOMO1, TCOMO2, . . . , TCOMOm. The selecting circuit 1128 selects one of the comparison output voltages COMO1, COMO2, . . . , COMOn, TCOMO1, TCOMO2, . . . , TCOMOm. The digital-to-analog converter 1129 performs digital-to-analog conversion with respect to an output signal of the selecting circuit 1125 to generate the first reference voltage REF_DHC.

Figure 17:
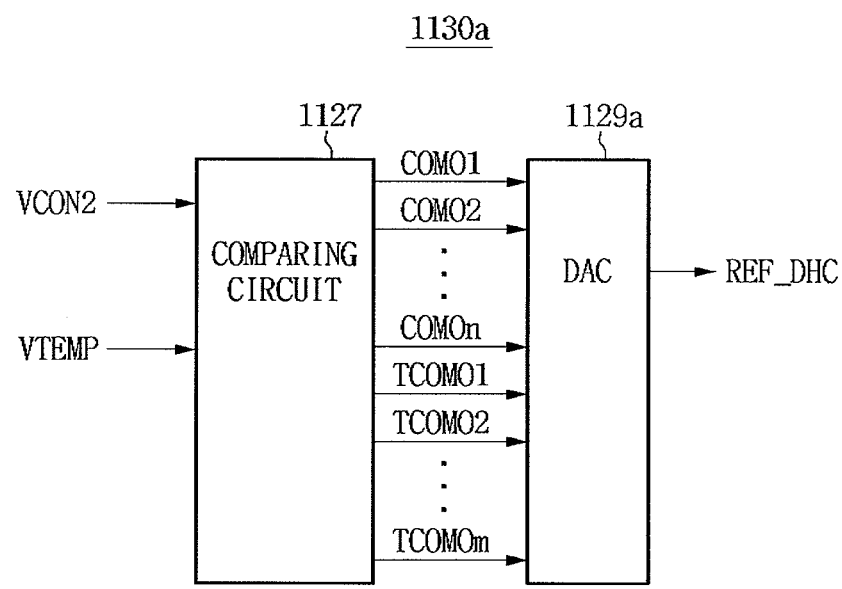
FIG. 17 illustrates a circuit diagram of an example of a reference voltage generating circuit included in the dynamic headroom controller of FIG. 16.

FIG. 17 illustrates a circuit diagram of an example of the reference voltage generating circuit 1130 included in the dynamic headroom controller 1120a of FIG. 16.

In the example shown in FIG. 17, the reference voltage generating circuit 1130a includes a comparing circuit 1127 and a digital-to-analog converter 1129a. The comparing circuit 1127 compares the second control signal VCON2 with at least one output reference voltage having different voltage levels from each other, and compares the temperature sensing voltage signal VTEMP with at least one temperature reference voltage having different voltage levels from each other to generate at least one comparison output voltage signal COMO1, COMO2, . . . , COMOn, TCOMO1, TCOMO2, . . . , TCOMOm. The digital-to-analog converter 1129a performs digital-to-analog conversion with respect to the comparison output voltage signals COMO1, COMO2, ..., COMOn, TCOMO1, TCOMO2, ..., TCOMOm to generate the first reference voltage REF_DHC.

Figure 18:
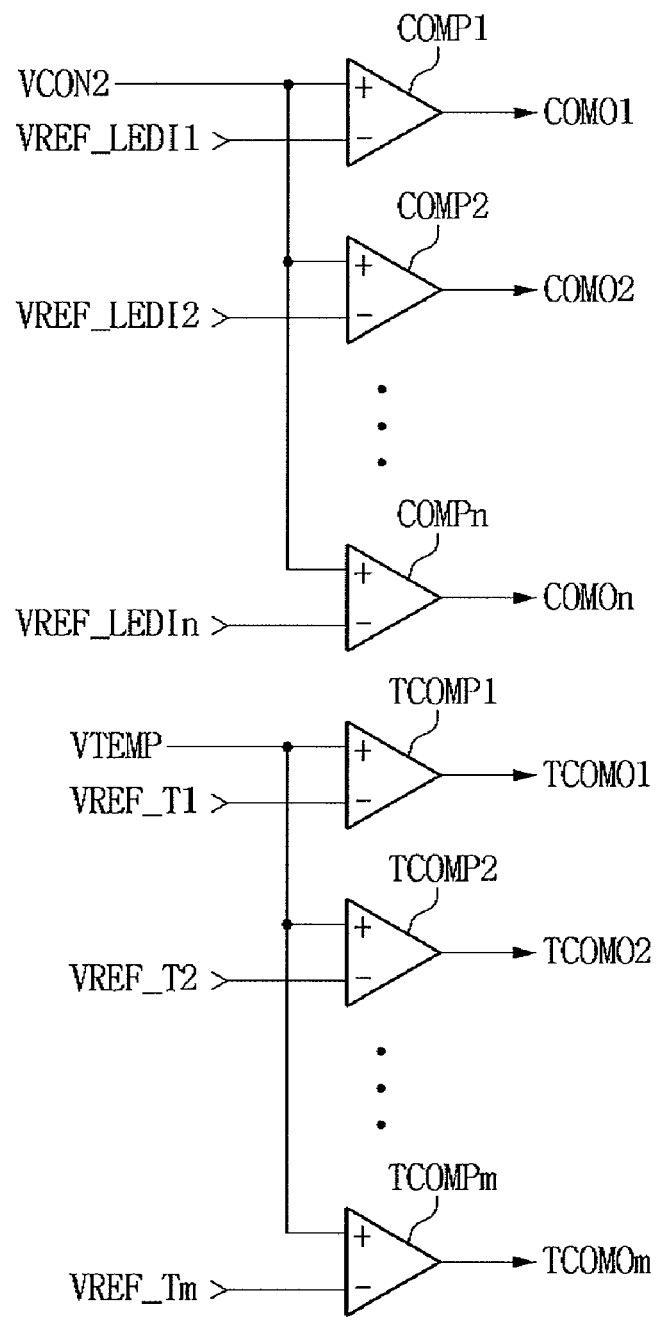
FIG. 18 illustrates a circuit diagram showing an example of a comparing circuit included in the dynamic headroom controller of FIG. 16.

FIG. 18 illustrates a circuit diagram of an example of the comparing circuit 1127 included in the dynamic headroom controller 1120a of FIG. 16.

In the example shown in FIG. 18, the comparing circuit 1127 includes at least one comparator COMP1, COMP2, ..., COMPn that compares the second control signal VCON2 with respective output reference voltages VREF_LEDI1, VREF_LEDI2, ..., VREF_LEDIn to generate the comparison output voltages COMO1, COMO2, ..., COMOn, and at least one comparator TCOMP1, TCOMP2, ..., COMPm that compares the temperature sensing voltage signal VTEMP with respective temperature reference voltages VREF_T1, VREF_T2, ..., VREF_Tm to generate the comparison output voltages TCOMO1, TCOMO2, ..., TCOMOm.

Hereinafter, an example operation of the light-emitting-diode driving circuit 2100 and the light-emitting-diode system 2000 including the light-emitting-diode driving circuit 2100 shown in FIG. 13 will be described referring to FIGS. 13-18.

The light-emitting-diode system 2000 of FIG. 13 changes the magnitude of the current flowing through the light-emitting-diode strings, and changes the voltages of the connecting points of each of the light-emitting-diode strings 1510, 1520, and 1530 and each of the power transistors in response to the first and second control signals VCON1 and VCON2 that include the information of the light-emitting-diode current input from the exterior and the temperature sensing voltage signal VTEMP. Therefore, voltages of each of the drain terminals of the power transistors increase according as drain currents of the power transistors included in the current drivers 1160, 1170, and 1180 increase.

When the temperature around the semiconductor integrated circuit decreases, the magnitude of a current flowing through active devices in the semiconductor integrated circuit is inclined to increase. Therefore, the light-emitting-diode system 2000 of FIG. 13 increases voltages of each of the power transistors as the drain currents of the power transistors included in the current drivers 1160, 1170, and 1180 increase, based on not only the first and second control signals VCON1 and VCON2 having the information of the light-emitting-diode current input from the exterior, but also the temperature sensing voltage signal VTEMP having the information of the temperature of a semiconductor integrated circuit.

Figure 19A:
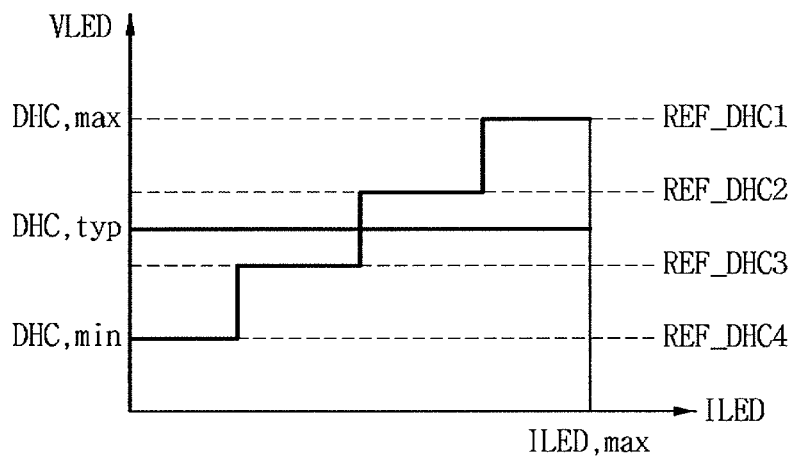
FIG. 19A to FIG. 19C illustrate diagrams of waveforms for explaining operations of the dynamic headroom controller of FIG. 16.
Figure 19B:
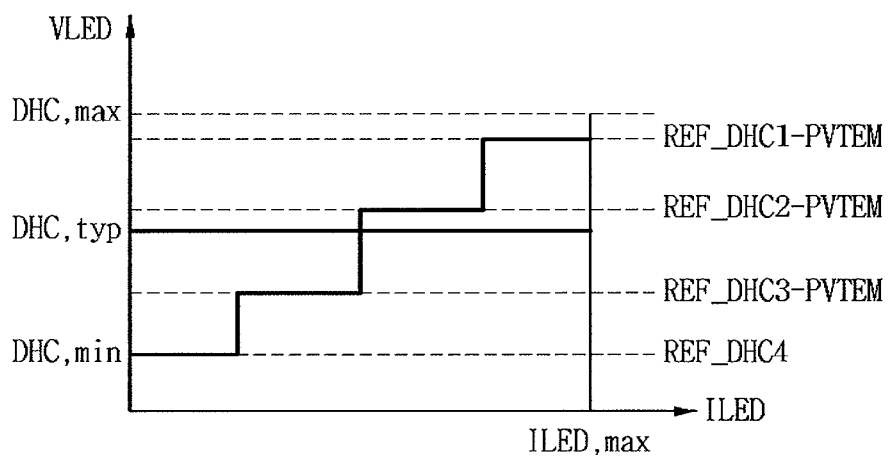
Figure 19C:
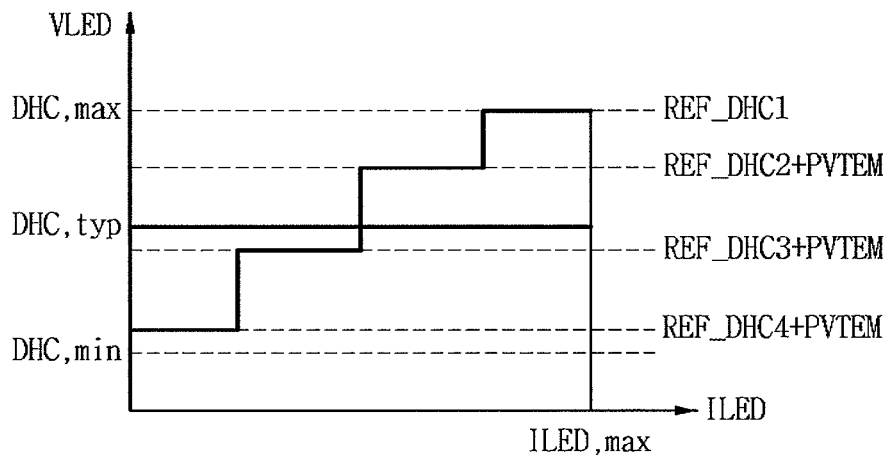

FIG. 19A to FIG. 19C illustrate diagrams of waveforms for explaining operations of the dynamic headroom controller 1120a of FIG. 16.

FIG. 19A illustrates a diagram of waveforms for explaining operations of the dynamic headroom controller 1120a when the temperature sensing voltage signal VTEMP is not included, and FIG. 19B and FIG. 19C illustrate diagrams of waveforms for explaining operations of the dynamic headroom controller 1120a when the temperature sensing voltage signal VTEMP is included. FIG. 19B and FIG. 19C illustrate diagrams of waveforms for explaining operations of the dynamic headroom controller 1120a when the temperature sensing voltage signal VTEMP is compared with one reference voltage.

Referring to FIG. 19A, the first reference voltage REF_DHC (used to compare with the minimum detection voltage signal VDET_MIN that has minimum voltage level among the voltage signals VLED_K1, VLED_K2, ..., VLED_Kn of the first terminals of each of the light-emitting-diode strings) has values DHC_REF1, DHC_REF2, DHC_REF3, and DHC_REF4 that change in the step form from the center of typical value DHC,typ between the maximum value DHC,max and the minimum value DHC,min. The first reference voltage REF_DHC changes in the step form because the comparing circuit 1127 of the reference voltage generating circuit 1130 compares the second control signal VCON2 with a plurality of output reference voltages VREF_LEDI1, VREF_LEDI2, ..., VREF_LEDIn. In FIG. 19A to FIG. 19C, waveforms are shown in cases where the second control signal VCON2 is compared with three output reference voltages VREF_LEDI1, VREF_LEDI2, VREF_LEDI3.

In a comparative circuit, the first reference voltage REF_DHC used for comparing the minimum detection voltage signal VDET_MIN may be fixed, and the voltage across power transistors does not change even if the light-emitting-diode current flowing through the power transistor changed. In such a case, the comparative light-emitting-diode driving circuit needs a power transistor having large size to meet the change of a target LED current.

FIG. 19B illustrates a diagram of waveforms for explaining operations of the dynamic headroom controller 1120a when the comparison output voltage signal (e.g., TCOMO1), which is the result of comparison between the temperature sensing voltage signal VTEMP and the temperature reference voltage VREF_T1, has a logic low state, and FIG. 19C illustrates a diagram of waveforms for explaining operations of the dynamic headroom controller 1120a when the comparison output voltage signal (e.g., TCOMO1) has a logic high state.

Referring to FIG. 19B, when the comparison output voltage signal (e.g., VREF_T1) has a logic low state, the first reference voltage REF_DHC used for comparing the minimum detection voltage signal VDET_MIN is lowered compared with FIG. 19A due to the influence of the temperature sensing voltage signal VTEMP. Referring to FIG. 10C, when the comparison output voltage signal (e.g., VREF_T1) has a logic high state, the first reference voltage REF_DHC used for comparing the minimum detection voltage signal VDET_MIN is increased compared with FIG. 19A due to the influence of the temperature sensing voltage signal VTEMP. In FIG. 19B and FIG. 19C, PVTEM denotes an analog signal corresponding to the temperature sensing voltage signal VTEMP.

FIG. 20 illustrates a table for explaining operations of the dynamic headroom controller of FIG. 16. In FIG. 20, the values of the first reference voltage REF_DHC are shown according to logic states of output voltages of the comparing circuit 1127 included in the reference voltage generating circuit 1130 in FIG. 16. In FIG. 20, PVTEM denotes an analog signal corresponding to the temperature sensing voltage signal VTEMP.

For example, when COMO1 has logic "0", COMO2 has logic "0", COMO3 has logic "1", and TCOMO1 has logic "1", the first reference voltage REF_DHC has a value of REF_DHC3+PVTEM as shown in the waveform of FIG. 19C.

Figure 21:
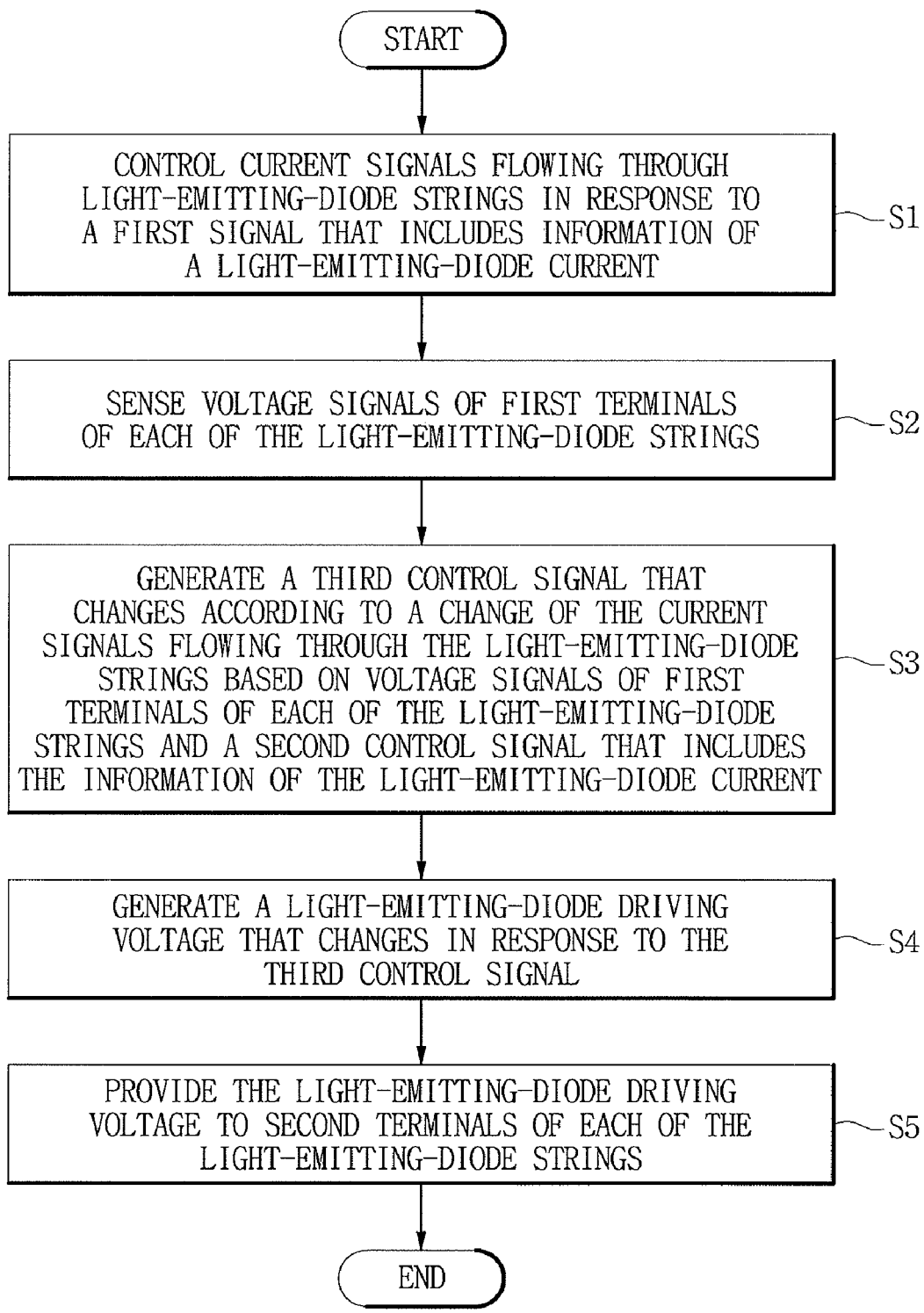
FIG. 21 illustrates a flowchart of a method of driving a light-emitting diode according to an example embodiment.

FIG. 21 illustrates a flowchart of a method of driving a light-emitting diode according to an example embodiment.

The example method of driving a light-emitting diode illustrated in FIG. 21 includes the following operations:

1) control current signals flowing through light-emitting-diode strings in response to a first signal that includes information of a light-emitting-diode current (S1);

2) sense the voltage signals of the first terminals of each of the light-emitting-diode strings (S2);

3) generate a third control signal that changes according to a change of the current signals flowing through the light-emitting-diode strings based on the voltage signals of the first terminals of each of the light-emitting-diode strings and a second control signal that includes the information of the light-emitting-diode current (S3);

4) generate a light-emitting-diode driving voltage that changes in response to the third control signal (S4); and 5) provide the light-emitting-diode driving voltage to second terminals of each of the light-emitting-diode strings (S5).

Figure 22:
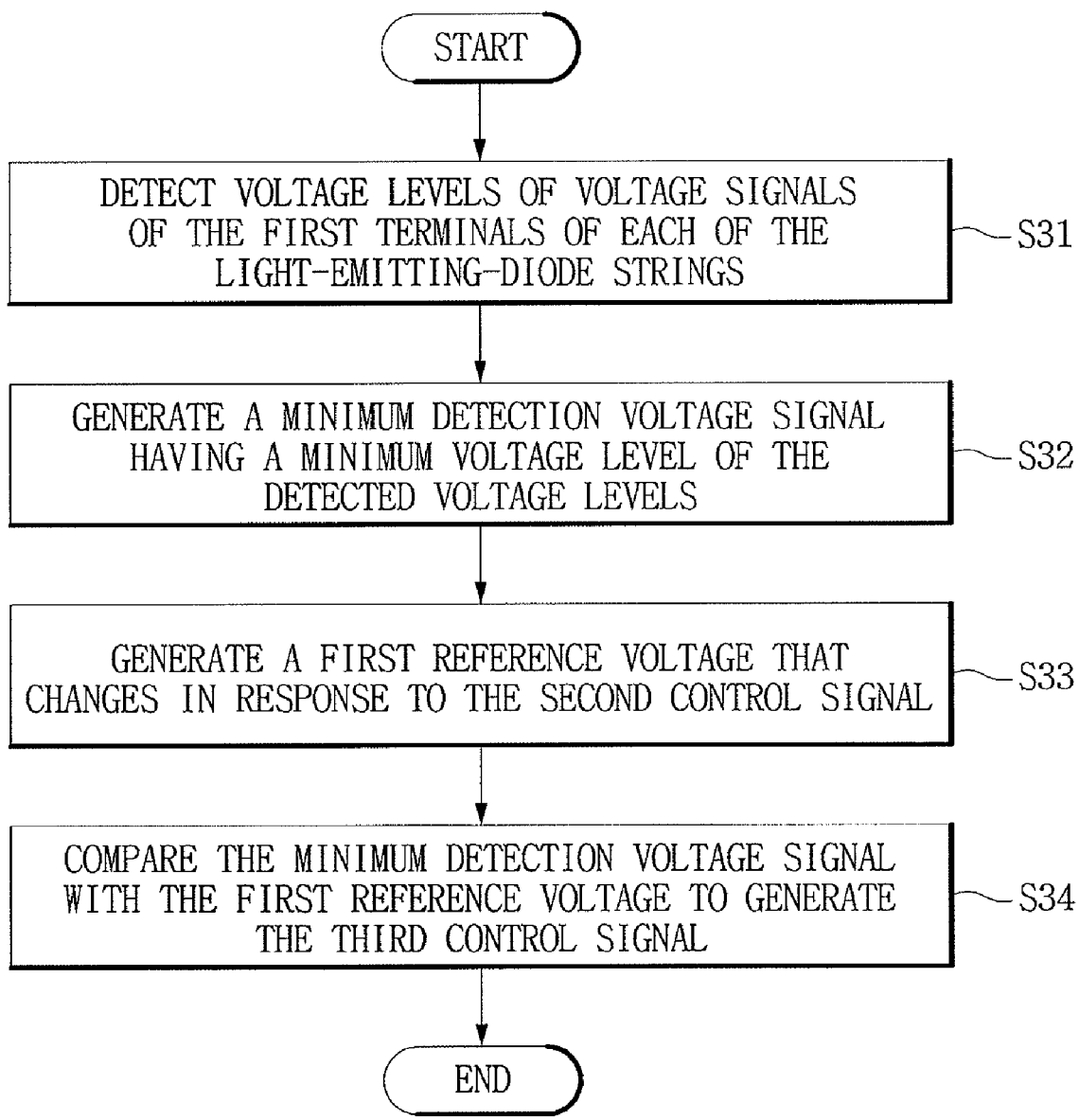
FIG. 22 illustrates a flowchart of a process of generating a third control signal shown in FIG. 21.

FIG. 22 illustrates a flowchart of an example process of generating a third control signal shown in FIG. 21.

The example process of generating a third control signal of the method of driving a light-emitting diode shown in FIG. 22 includes the following operations:

1) detect the voltage levels of the voltage signals of the first terminals of each of the light-emitting-diode strings (S31);

2) generate a minimum detection voltage signal having a minimum voltage level of the detected voltage levels (S32);

3) generate a first reference voltage that changes in response to the second control signal (S33); and 4) compare the minimum detection voltage signal with the first reference voltage to generate the third control signal (S34).

Figure 23:
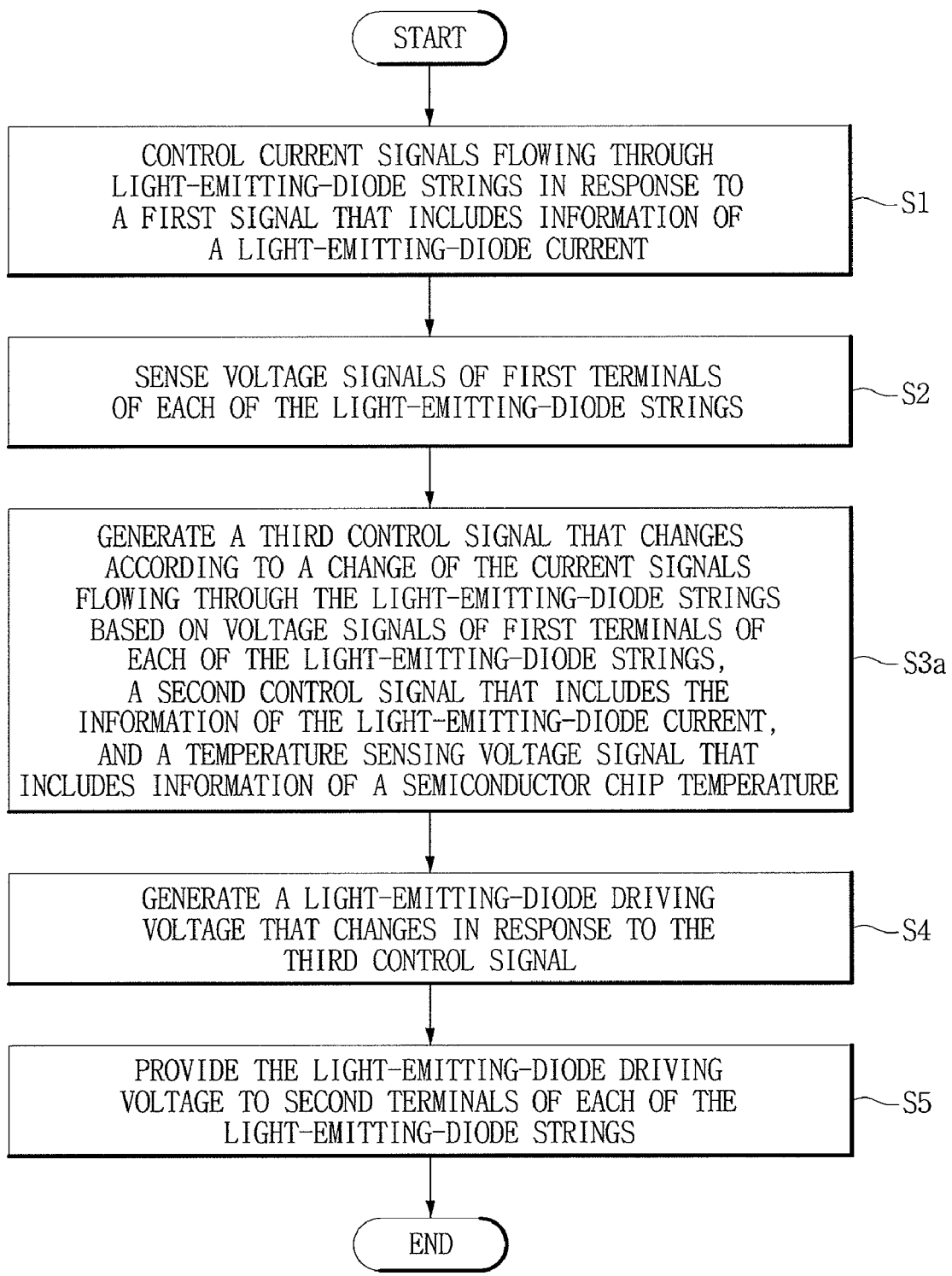
FIG. 23 illustrates a flowchart of a method of driving a light-emitting diode according to another example embodiment.

FIG. 23 illustrates a flowchart of a method of driving a light-emitting diode according to another example embodiment.

The example method of driving a light-emitting diode of FIG. 23 includes the following operations:

1) control current signals flowing through light-emitting-diode strings in response to a first signal that includes information of a light-emitting-diode current (S1);

2) sense the voltage signals of the first terminals of each of the light-emitting-diode strings (S2);

3) generate a third control signal that changes according to a change of the current signals flowing through the light-emitting-diode strings based on the voltage signals of the first terminals of each of the light-emitting-diode strings, a second control signal that includes the information of the light-emitting-diode current, and a temperature sensing voltage signal that includes information of a semiconductor chip temperature (S3a);

4) generate a light-emitting-diode driving voltage that changes in response to the third control signal (S4); and 5) provide the light-emitting-diode driving voltage to second terminals of each of the light-emitting-diode strings (S5).

Figure 24:
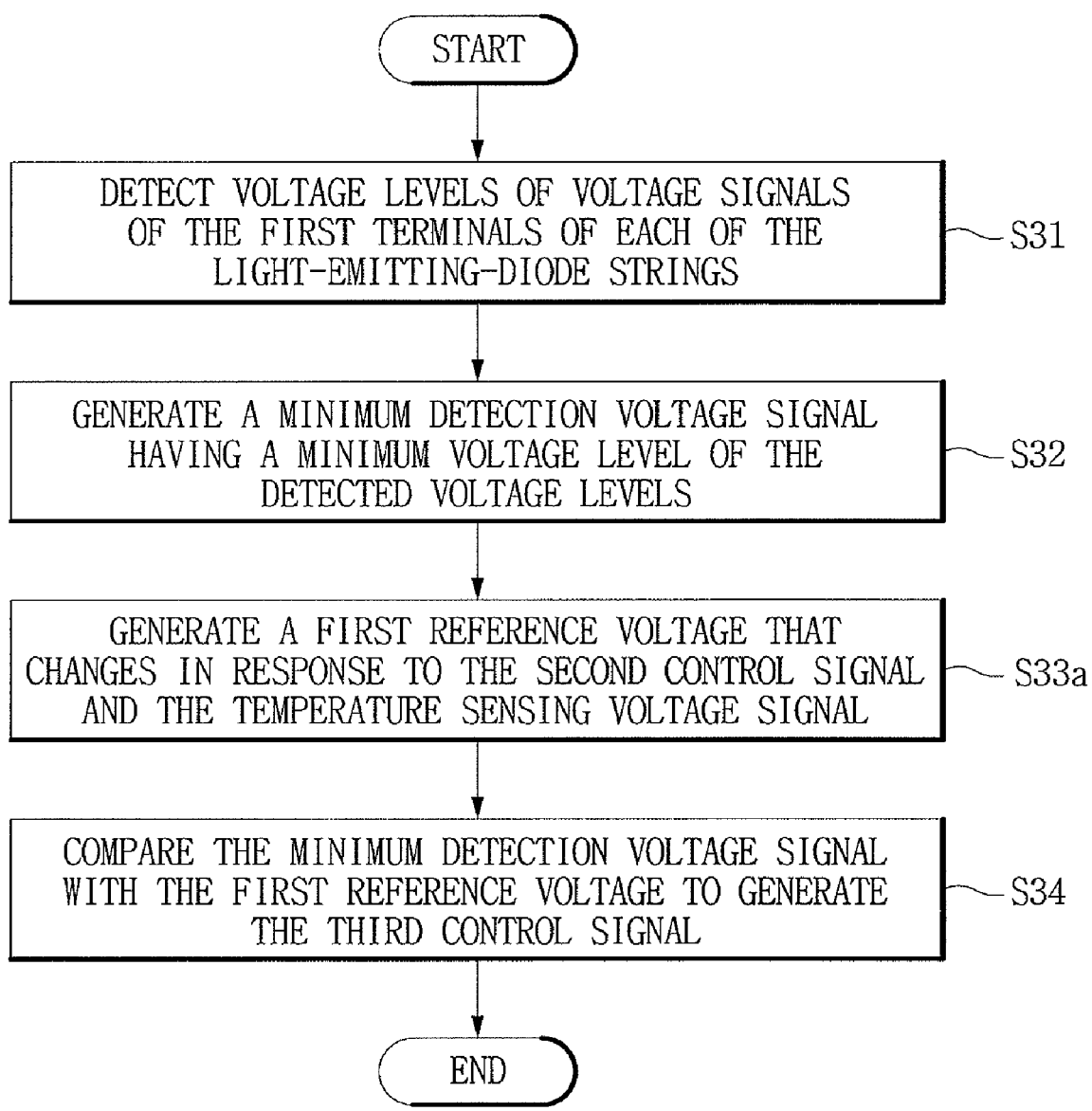
FIG. 24 illustrates a flowchart of a process of generating a third control signal shown in FIG. 23.

FIG. 24 illustrates a flowchart of an example process of generating a third control signal shown in FIG. 23.

The example process of generating a third control signal of the method of driving a light-emitting diode shown in FIG. 24 includes the following operations:

1) detect the voltage levels of the voltage signals of the first terminals of each of the light-emitting-diode strings (S31);

2) generate a minimum detection voltage signal having a minimum voltage level of the detected voltage levels (S32);

3) generate a first reference voltage that changes in response to the second control signal and the temperature sensing voltage signal (S33a); and 4) compare the minimum detection voltage signal with the first reference voltage to generate the third control signal (S34).

Figure 25:
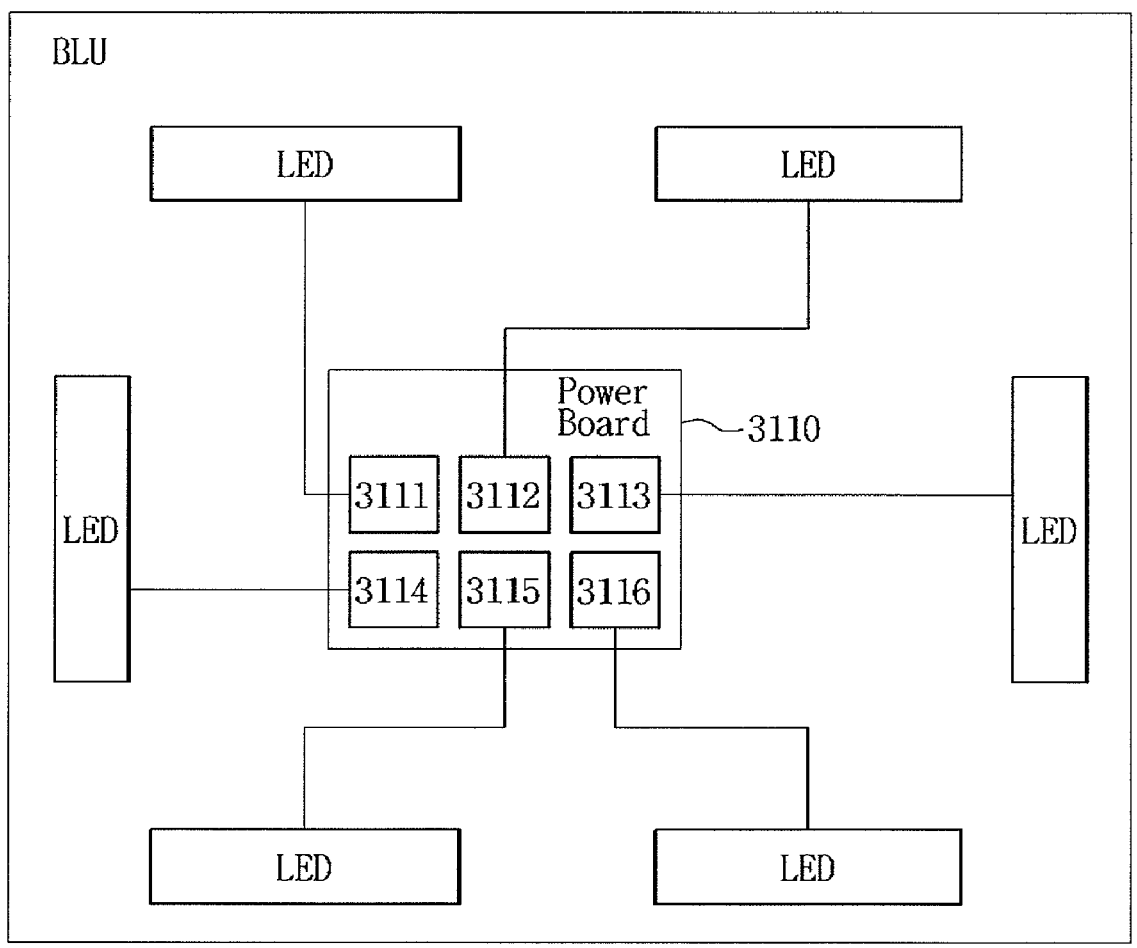
FIG. 25 illustrates a block diagram of an example of a back-light system including a light-emitting-diode driving circuit according to example embodiments.

FIG. 25 illustrates a block diagram of an example of a back-light system 3100 including a light-emitting-diode driving circuit according to example embodiments.

In the example shown in FIG. 25, the back-light system 3100 includes a back-light unit BLU, a power board 3110 included in the back-light unit BLU, and light-emitting-diode arrays LED. Each of the light-emitting-diode arrays LED may include at least one light-emitting-diode string. The light-emitting-diode string may include at least one light-emitting diode. The power board 3110 includes light-emitting-diode driving circuits 3111 to 3116 having the same circuit structure as the light-emitting-diode driving circuit 1100 or 2100 shown in FIG. 1 or FIG. 13. The power board 3110 may change the drain-source voltages of power transistors according to the magnitude of current flowing through the light-emitting-diode strings based on a target light-emitting-diode current and a temperature sensing voltage signal. Therefore, the power transistors that drive the light-emitting-diode current, included in each of the light-emitting-diode driving circuits 3111 to 3116 may be designed in small size.

The back-light system 3100 shown in FIG. 25 may be applied to display devices including large display panels such as edge-type light-emitting-diode (LED) television sets.

Figure 26:
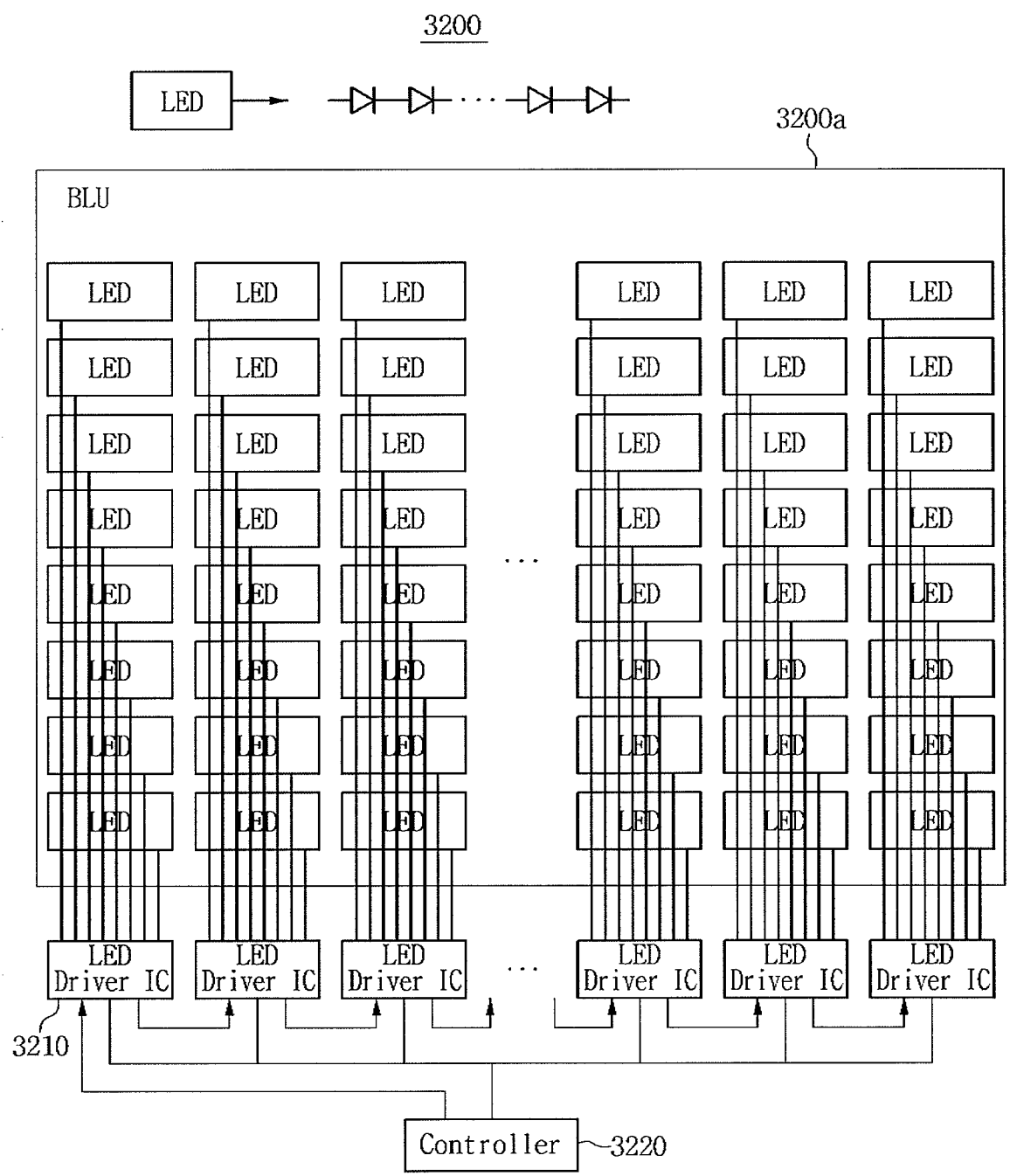
FIG. 26 illustrates a block diagram of another example of a back-light system including a light-emitting-diode driving circuit according to example embodiments.

FIG. 26 illustrates a block diagram of another example of a back-light system 3200 including a light-emitting-diode driving circuit according to example embodiments.

In the example shown in FIG. 26, the back-light system 3200 includes a back-light unit BLU including light-emitting-diode arrays LED, a controller 3220, and light-emitting-diode driving circuits 3210 driving the light-emitting-diode arrays LED under the control of the controller 3220. Each of the light-emitting-diode arrays LED may include at least one light-emitting-diode string. The light-emitting-diode string may include at least one light-emitting diode.

In the example shown in FIG. 26, each of the light-emitting-diode driving circuits 3210 has the same circuit structure as the light-emitting-diode driving circuit 1100 or 2100 shown in FIG. 1 or FIG. 13, and may change the drain-source voltages of power transistors according to the magnitude of current flowing through the light-emitting-diode strings based on a target light-emitting-diode current and a temperature sensing voltage signal. Therefore, the power transistors that drive the light-emitting-diode current, included in each of the light-emitting-diode driving circuits 3210, may be designed in small size.

The back-light system 3200 shown in FIG. 26 may be applied to display devices including large display panels such as direct-type light-emitting-diode (LED) television sets.

Figure 27:
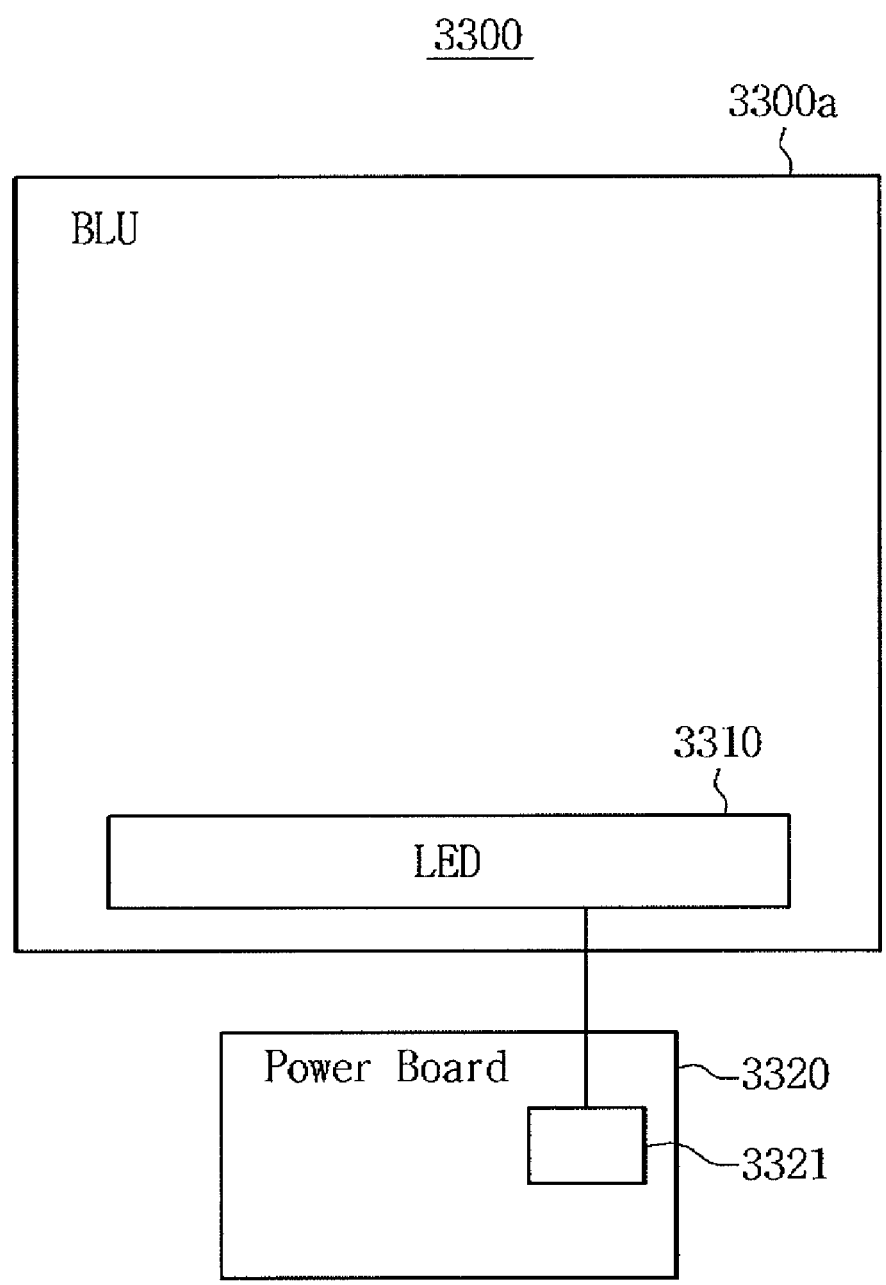
FIG. 27 illustrates a block diagram of still another example of a back-light system including a light-emitting-diode driving circuit according to example embodiments.

FIG. 27 illustrates a block diagram of still another example of a back-light system including a light-emitting-diode driving circuit according to example embodiments.

In the example shown in FIG. 27, the back-light system 3300 includes a back-light unit BLU including light-emitting-diode arrays LED, and a power board 3110 that is outside of the back-light unit BLU. Each of the light-emitting-diode arrays LED may include at least one light-emitting-diode string. The light-emitting-diode string may include at least one light-emitting diode. The power board 3320 includes a light-emitting-diode driving circuit 3321 having the same circuit structure as the light-emitting-diode driving circuit 1100 or 2100 shown in FIG. 1 or FIG. 13. The power board 3320 may change the drain-source voltages of power transistors according to the magnitude of current flowing through the light-emitting-diode strings based on a target light-emitting-diode current and a temperature sensing voltage signal. Therefore, the power transistors that drive the light-emitting-diode current, included in the light-emitting-diode driving circuit 3321 may be designed in small size.

The back-light system 3300 shown in FIG. 27 may be applied to display devices including small display panels such as a mobile phone, a personal digital assistant (PDA), and a portable multimedia player (PMP).

In the above, the back-light driving circuit used in liquid-crystal-display panels (LCD) is mainly described, but the example embodiments may be applied to various display devices such as plasma display panels (PDP), organic light emitting diodes (OLED), and light-emitting diodes for lamps.

As described above, a light-emitting-diode driving circuit and a light-emitting-diode system according to example embodiments may control the magnitude of light-emitting-diode driving voltage supplied to the light-emitting-diode strings in response to an information signal of a light-emitting-diode current and/or information of the temperature. The light-emitting-diode driving circuit may change the drain-source voltages of power transistors according to the magnitude of current flowing through the light-emitting-diode strings. Therefore, the power transistors that drive the light-emitting-diode current, included in the light-emitting-diode driving circuit, may be designed in small size. Further, the light-emitting-diode driving circuit may have low parasitic capacitance because of the power transistors having small size. Accordingly, the light-emitting-diode driving circuit may operate at high speed and may be inexpensive to produce.

The LED driving circuit may occupy a small area of a semiconductor integrated circuit. The LED driving circuit may include a current driving circuit, a dynamic headroom controller and a power supply circuit. The current driving circuit may control current signals flowing through LED strings, the dynamic headroom controller may generate a third control signal that changes according to a change of the current signals flowing through the light-emitting-diode strings, and the power supply circuit may generate an LED driving voltage that changes in response to the third control signal.

The foregoing is illustrative of example embodiments and is not to be construed as limiting thereof. Although a few example embodiments have been described, those skilled in the art will readily appreciate that many modifications are possible in example embodiments without materially departing from the novel teachings and advantages. Accordingly, all such modifications are intended to be included within the scope of this invention as defined in the claims. In the claims, means-plus-function clauses are intended to cover the structures described herein as performing the recited function, and not only structural equivalents but also equivalent structures. Therefore, it is to be understood that the foregoing is illustrative of various example embodiments and is not to be construed as limited to the specific embodiments disclosed, and that modifications to the disclosed embodiments, as well as other embodiments, are intended to be included within the scope of the appended claims.

What is claimed is:
1. A light-emitting-diode driving circuit, comprising:
a current driving circuit configured to control current signals flowing through light-emitting-diode strings in response to a first control signal that includes information of a light-emitting-diode current;
a dynamic headroom controller configured to generate a third control signal that changes according to a change of the current signals flowing through the light-emitting-diode strings based on voltage signals of first terminals of each of the light-emitting-diode strings and a second control signal that includes the information of the light-emitting-diode current; and
a power supply circuit configured to generate a light-emitting-diode driving voltage that changes in response to the third control signal, and provide the light-emitting-diode driving voltage to second terminals of each of the light-emitting-diode strings, wherein the dynamic headroom controller includes:

a level detector configured to detect voltage levels of the voltage signals of the first terminals of each of the light-emitting-diode strings, and generate a minimum detection voltage signal having a minimum voltage level of the detected voltage levels;
a reference voltage generating circuit configured to generate a first reference voltage that changes in response to the second control signal; and
a comparator configured to compare the minimum detection voltage signal with the first reference voltage to generate the third control signal.

2. The light-emitting-diode driving circuit as claimed in claim 1, wherein the first control signal and the second control signal are configured to be generated based on an information signal of a target light-emitting-diode current generated inside or outside of a semiconductor integrated circuit in which the light-emitting-diode driving circuit is included.

3. The light-emitting-diode driving circuit as claimed in claim 1, wherein the reference voltage generating circuit includes:
a comparing circuit configured to compare the second control signal with at least one output reference voltage having different voltage levels from each other to generate at least one comparison output voltage signal;
a selecting circuit configured to select one of the comparison output voltages; and
a digital-to-analog converter configured to perform digital-to-analog conversion with respect to an output signal of the selecting circuit to generate the first reference voltage.

4. The light-emitting-diode driving circuit as claimed in claim 3, wherein the comparing circuit includes at least one comparator that compares the second control signal with each of the output reference voltages to generate the comparison output voltages.

5. The light-emitting-diode driving circuit as claimed in claim 1, wherein the reference voltage generating circuit includes:
a comparing circuit configured to compare the second control signal with at least one output reference voltage having different voltage levels from each other to generate at least one comparison output voltage signal; and
a digital-to-analog converter configured to perform digital-to-analog conversion with respect to the comparison output voltage signals to generate the first reference voltage.

6. A light-emitting-diode driving circuit, comprising:
a current driving circuit configured to control current signals flowing through light-emitting-diode strings in response to a first control signal that includes information of a light-emitting-diode current;
a dynamic headroom controller configured to generate a third control signal that changes according to a change of the current signals flowing through the light-emitting-diode strings based on voltage signals of first terminals of each of the light-emitting-diode strings and a second control signal that includes the information of the light-emitting-diode current; and
a power supply circuit configured to generate a light-emitting-diode driving voltage that changes in response to the third control signal, and provide the light-emitting-diode driving voltage to second terminals of each of the light-emitting-diode strings, wherein the first control signal and the second control signal are configured to be a voltage signal that is generated by adjusting a current of a current source in response to an information signal of a light-emitting-diode current.

7. A light-emitting-diode driving circuit, comprising:
a current driving circuit configured to control current signals flowing through light-emitting-diode strings in response to a first control signal that includes information of a light-emitting-diode current;
a dynamic headroom controller configured to generate a third control signal that changes according to a change of the current signals flowing through the light-emitting-diode strings based on voltage signals of first terminals of each of the light-emitting-diode strings and a second control signal that includes the information of the light-emitting-diode current; and
a power supply circuit configured to generate a light-emitting-diode driving voltage that changes in response to the third control signal, and provide the light-emitting-diode driving voltage to second terminals of each of the light-emitting-diode strings, wherein the first control signal is configured to be a voltage signal that is generated by adjusting a current of a current source in response to an information signal of a light-emitting-diode current, and the second control signal is configured to be a signal that is output from a memory device in which the information signal of the light-emitting-diode current is stored.

8. The light-emitting-diode driving circuit as claimed in claim 1, wherein drain-source voltages of power transistors constituting the current driving circuit are configured to be changed according to changes of current signals flowing through the light-emitting-diode strings.

9. The light-emitting-diode driving circuit as claimed in claim 8, wherein the current signals flowing through the light-emitting-diode strings are configured to be the same as drain currents of the power transistors.

10. A light-emitting-diode driving circuit, comprising:
a current driving circuit configured to control current signals flowing through light-emitting-diode strings in response to a first signal that includes information of a light-emitting-diode current;
a dynamic headroom controller configured to generate a third control signal that changes according to a change of the current signals flowing through the light-emitting-diode strings based on voltage signals of first terminals of each of the light-emitting-diode strings, a second control signal that includes the information of the light-emitting-diode current, and a temperature sensing voltage signal that includes information of a semiconductor chip temperature; and
a power supply circuit configured to generate a light-emitting-diode driving voltage that changes in response to the third control signal, and provide the light-emitting-diode driving voltage to second terminals of each of the light-emitting-diode strings.

11. The light-emitting-diode driving circuit as claimed in claim 10, wherein the dynamic headroom controller includes:
a level detector configured to detect voltage levels of the voltage signals of the first terminals of each of the light-emitting-diode strings, and generate a minimum detection voltage signal having a minimum voltage level of the detected voltage levels;
a reference voltage generating circuit configured to generate a first reference voltage that changes in response to the second control signal and the temperature sensing voltage signal; and
a comparator configured to compare the minimum detection voltage signal with the first reference voltage to generate the third control signal.

12. The light-emitting-diode driving circuit as claimed in claim 11, wherein the reference voltage generating circuit includes:
a comparing circuit configured to compare the second control signal with at least one output reference voltage having different voltage levels from each other and compare the temperature sensing voltage signal with at least one temperature reference voltage having different voltage levels from each other to generate at least one comparison output voltage signal;
a selecting circuit configured to select one of the comparison output voltages; and
a digital-to-analog converter configured to perform digital-to-analog conversion with respect to an output signal of the selecting circuit to generate the first reference voltage.

13. The light-emitting-diode driving circuit as claimed in claim 12, wherein the comparing circuit includes at least one comparator that compares the second control signal with each of the output reference voltages and compares the temperature sensing voltage signal with each of the temperature reference voltages to generate the comparison output voltages.

14. The light-emitting-diode driving circuit as claimed in claim 11, wherein the reference voltage generating circuit includes:
a comparing circuit configured to compare the second control signal with at least one output reference voltage having different voltage levels from each other and compare the temperature sensing voltage signal with at least one temperature reference voltage having different voltage levels from each other to generate at least one comparison output voltage signal; and
a digital-to-analog converter configured to perform digital-to-analog conversion with respect to the comparison output voltage signals to generate the first reference voltage.

15. The light-emitting-diode driving circuit as claimed in claim 10, further comprising a temperature sensing circuit that senses a temperature of a semiconductor integrated circuit in which the light-emitting-diode driving circuit is included, and generates the temperature sensing voltage signal.

16. A method of driving a light-emitting diode, comprising:
controlling current signals flowing through light-emitting-diode strings in response to a first signal that includes information of a light-emitting-diode current;
sensing voltage signals of first terminals of each of the light-emitting-diode strings;
generating a third control signal that changes according to a change of the current signals flowing through the light-emitting-diode strings based on the voltage signals of the first terminals of each of the light-emitting-diode strings and a second control signal that includes the information of the light-emitting-diode current;
generating a light-emitting-diode driving voltage that changes in response to the third control signal; and
providing the light-emitting-diode driving voltage to second terminals of each of the light-emitting-diode strings, wherein the generating of the third control signal includes:
detecting voltage levels of the voltage signals of the first terminals of each of the light-emitting-diode strings;
generating a minimum detection voltage signal having a minimum voltage level of the detected voltage levels;
generating a first reference voltage that changes in response to the second control signal; and comparing the minimum detection voltage signal with the first reference voltage to generate the third control signal.

17. A method of driving a light-emitting diode, comprising:
controlling current signals flowing through light-emitting-diode strings in response to a first signal that includes information of a light-emitting-diode current;
sensing voltage signals of first terminals of each of the light-emitting-diode strings;
generating a third control signal that changes according to a change of the current signals flowing through the light-emitting-diode strings based on the voltage signals of the first terminals of each of the light-emitting-diode strings, a second control signal that includes the information of the light-emitting-diode current, and a temperature sensing voltage signal that includes information of a semiconductor chip temperature;
generating a light-emitting-diode driving voltage that changes in response to the third control signal; and
providing the light-emitting-diode driving voltage to second terminals of each of the light-emitting-diode strings.

18. The method of driving a light-emitting diode as claimed in claim 17, wherein the generating of the third control signal includes:
detecting voltage levels of the voltage signals of the first terminals of each of the light-emitting-diode strings;
generating a minimum detection voltage signal having a minimum voltage level of the detected voltage levels;
generating a first reference voltage that changes in response to the second control signal and the temperature sensing voltage signal; and
comparing the minimum detection voltage signal with the first reference voltage to generate the third control signal.

* * * * *